(12) United States Patent
Akatsuka et al.

(10) Patent No.: US 11,635,870 B2
(45) Date of Patent: Apr. 25, 2023

(54) INFORMATION PROCESSING METHOD, INFORMATION PROCESSING SYSTEM, AND PROGRAM

(71) Applicant: SINTOKOGIO, LTD., Nagoya (JP)

(72) Inventors: Narihiro Akatsuka, Nagoya (JP); Yoshitsugu Tanaka, Nagoya (JP); Naohisa Nakamura, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 17/518,643

(22) Filed: Nov. 4, 2021

(65) Prior Publication Data

US 2022/0147037 A1   May 12, 2022

(30) Foreign Application Priority Data

Nov. 11, 2020 (JP) .............................. JP2020-188250

(51) Int. Cl.
*G06F 3/04817* (2022.01)
*G05B 23/02* (2006.01)

(52) U.S. Cl.
CPC ..... *G06F 3/04817* (2013.01); *G05B 23/0272* (2013.01)

(58) Field of Classification Search
CPC ............. G05B 23/0272; G06F 3/04817; G06F 3/04847
See application file for complete search history.

(56) References Cited

U.S. PATENT DOCUMENTS

| | | | | |
|---|---|---|---|---|
| 11,210,278 | B1 * | 12/2021 | Dean .................. | G06F 16/2453 |
| 2013/0227473 | A1 * | 8/2013 | Corvo ................ | G06F 3/04817 |
| | | | | 715/799 |
| 2013/0263053 | A1 * | 10/2013 | Tritschler ............ | G06F 3/04817 |
| | | | | 715/835 |
| 2014/0258940 | A1 * | 9/2014 | Han .................... | G06F 3/04847 |
| | | | | 715/854 |
| 2017/0227944 | A1 * | 8/2017 | Goli .................... | G06F 3/0482 |
| 2018/0293038 | A1 * | 10/2018 | Meruva ............... | G06F 3/0481 |
| 2018/0300437 | A1 | 10/2018 | Thomsen et al. | |
| 2020/0110531 | A1 * | 4/2020 | Sarang ................ | G06F 3/0483 |

FOREIGN PATENT DOCUMENTS

| | | |
|---|---|---|
| EP | 0528396 A2 | 2/1993 |
| JP | 05-210478 | 8/1993 |
| JP | 2014-528861 A | 10/2014 |
| WO | WO-2013/055801 A1 | 4/2013 |

OTHER PUBLICATIONS

CA Extended European Search Report dated Mar. 16, 2022.

* cited by examiner

*Primary Examiner* — Mong-Shune Chung
(74) *Attorney, Agent, or Firm* — Harness, Dickey & Pierce, P.L.C.

(57) ABSTRACT

To achieve the object of making it easier to collectively grasp the state of the production line, an information processing method includes a first screen displaying step and a second screen displaying step. A first screen displaying step displays a first screen including a plurality of widgets. Each of the widgets is configured based on information outputted from application software which is associated with each of the widgets among a plurality of pieces of application software that manage a state of a production line. A second screen displaying step, when an operation performed on any widget of the plurality of widgets has been accepted, displays a second screen of application software which is associated with the widget.

7 Claims, 18 Drawing Sheets

FIG. 13

<FACILITY MONITOR SCREEN> (SECOND SCREEN)

| | DATE AND TIME OF ISSUANCE | DATE AND TIME OF RECOVERY | LINE | FACILITY | DEGREE OF URGENCY | ALARM | STATUS OF HANDLING | |
|---|---|---|---|---|---|---|---|---|
| ● | 9/9 12:11 | 10/9 12:11 | ********* | ********* | URGENT | ******** | NOT HANDLED | ☑ 🔲 |
| ● | 9/9 12:11 | 10/9 12:11 | ********* | ********* | CAUTION | ******** | NOT HANDLED | ☑ 🔲 |
| ● | 9/9 12:11 | 10/9 12:11 | ********* | ********* | WARNING | ************ | ICHIRO SUZUKI | ☑ 🔲 |
| ● | 9/9 12:11 | 10/9 12:11 | ********* | ********* | WARNING | *************** | ICHIRO SUZUKI | ☑ 🔲 |
| ● | 9/9 12:11 | 10/9 12:11 | ********* | ********* | URGENT | *************** | ICHIRO SUZUKI | ☑ 🔲 |
| ● | 9/9 12:11 | 10/9 12:11 | ********* | ********* | WARNING | *************** | ICHIRO SUZUKI | ☑ 🔲 |

G22

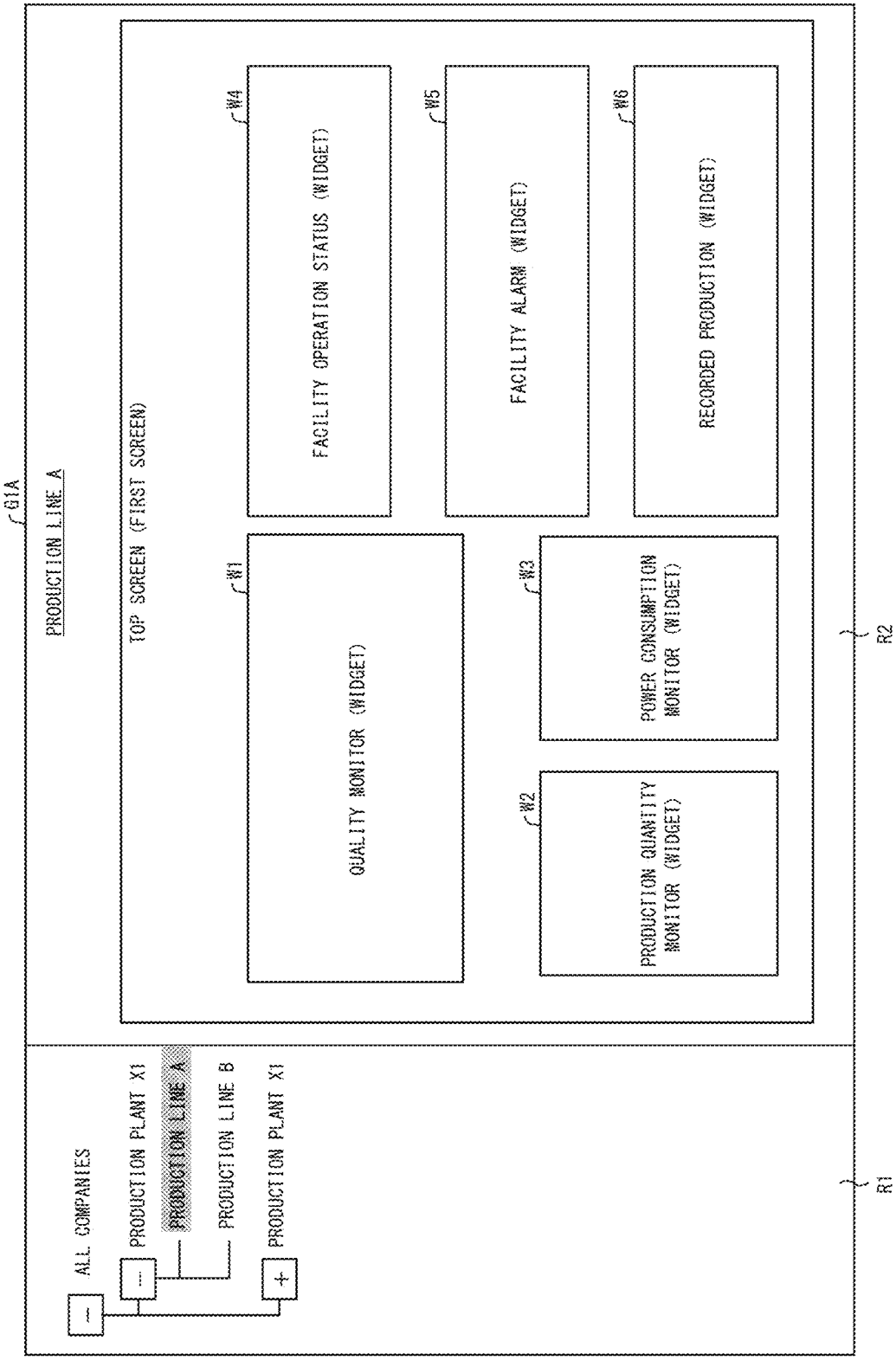

INFORMATION PROCESSING METHOD, INFORMATION PROCESSING SYSTEM, AND PROGRAM

This Nonprovisional application claims priority under 35 U.S.C. § 119 on Patent Application No. 2020-188250 filed in Japan on Nov. 11, 2020, the entire contents of which are hereby incorporated by reference.

TECHNICAL FIELD

The present invention relates to a technique for managing a production line.

BACKGROUND ART

Techniques for managing production lines are known. For example, Patent Literature 1 describes a system in which a server provides a service for controlling a production line, and a plurality of control applications on a terminal each display windows of the service on a display. Patent Literature 2 describes a system in which a window containing the result of processing of data collected from a plurality of production tools in operation is displayed on a device which is located at a remote site.

CITATION LIST

Patent Literatures

[Patent Literature 1]
Japanese Patent Application Publication Tokukaihei No. 5-210478 (Publication date: Aug. 20, 1993)
[Patent Literature 2]
Published Japanese Translation of PCT International Application Tokuhyo No. 2014-528861 (Publication date: Oct. 30, 2014)

SUMMARY OF INVENTION

Technical Problem

Unfortunately, in the technique described in Patent Literature 1, the user needs to browse respective windows of a plurality of control applications to grasp the state of the production system. Further, in the technique described in Patent Literature 2, the user needs to browse respective windows corresponding to the plurality of production tools to grasp the state of the plurality of production tools. Thus, the techniques described in Patent Literatures 1 and 2 have difficulty in collectively grasp the state of the production line.

An aspect of the present invention has been made in view of the above problems, and it is an object of the aspect of the present invention to realize the technique of making it easier to collectively grasping the state of a production line.

Solution to Problem

To solve the above problems, an information processing method in accordance with an aspect of the present invention is an information processing method executed by one or more processors. The information processing method includes a first screen displaying step and a second screen displaying step. Further, the information processing system in accordance with an aspect of the present invention includes one or more processors. The one or more processors execute a first screen displaying process and the second screen displaying process.

In the first screen displaying step (first screen displaying process), the one or more processors display a first screen including a plurality of widgets on a display. Each of the widgets is configured based on information outputted from application software which is associated with each of the widgets among a plurality of pieces of application software that manage a state of a production line. In the second screen displaying step (second screen displaying process), the one or more processors, when having accepted an operation performed on any widget of the plurality of widgets, controls the application software associated with the widget to display a second screen on the display. The second screen is a screen generated by the application software.

Advantageous Effects of Invention

According to the aspect of the present invention, it is possible to realize the technique of making it easier to collectively grasp the state of a production line.

BRIEF DESCRIPTION OF DRAWINGS

FIG. 13 is a view illustrating another example of the second screen generated by the application software illustrated in FIG. 11.

FIG. 19 is a diagram illustrating an example of a first screen in accordance with Embodiment 2.

DESCRIPTION OF EMBODIMENTS

Embodiment 1

The following description will discuss Embodiment 1 of the present invention with reference to the drawings.

<Outline of Functional Configuration of Server 1>

Figure 1:
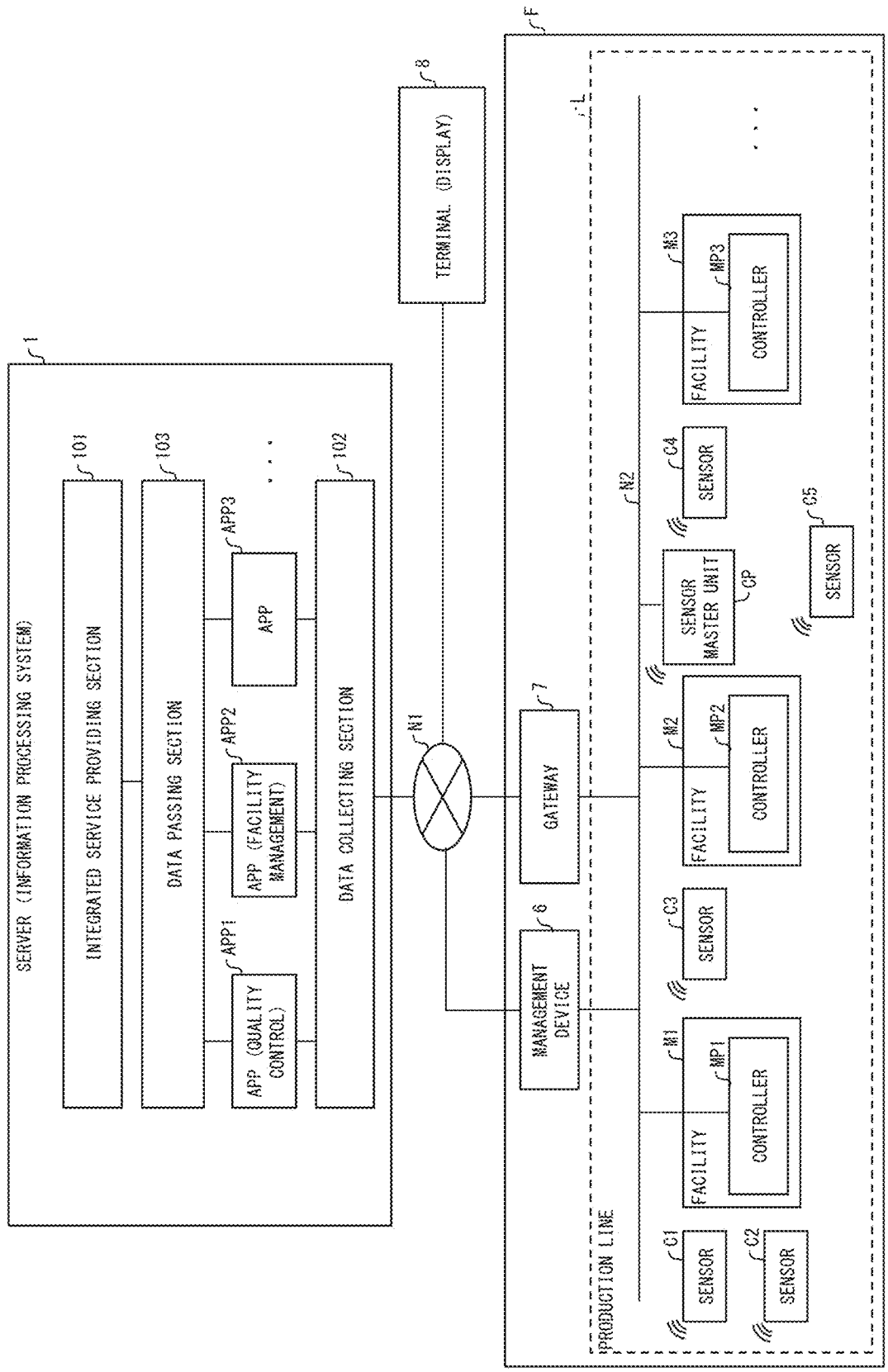
FIG. 1 is a block diagram illustrating a functional configuration of an information processing system (server) in accordance with Embodiment 1.

A functional configuration of an information processing system in accordance with the present embodiment will be discussed with reference to FIG. 1. The information processing system in accordance with the present embodiment is realized as a server 1 illustrated in FIG. 1 as an example. FIG. 1 is a block diagram illustrating a functional configuration of the server 1.

The server 1 provides an integrated service using a plurality of pieces of application software APPx (x=1, 2, . . . ) that manage the state of a production line L. In the present embodiment, the production line L is a line for producing castings and is installed in a production plant F. Examples of the state of the production line L include the states of individual processes carried out on the production line L, the state of each facility used on the production line L, a production status on the production line L, an environment on the production line L, and the like. However, the production line L and the state of the production line L in the present embodiment are not limited to those described above.

Note that the "application software" is software that provides a function of managing the state of the production line L, and operates on the operating system of the server 1. Hereinafter, the application software APPx is also referred to simply as "app APPx". Details of the app APPx will be discussed later.

The server 1 executes, as an integrated service, an information processing method in accordance with the present embodiment. By executing the information processing method, the server 1 executes a first screen displaying process for displaying a first screen and a second screen displaying process for displaying a second screen in response to an operation performed on the first screen. Here, the first screen and the second screen are displayed on a display of a terminal 8. The display of the terminal 8 is an example of the display in the present invention. Hereinafter, displaying on the display of the terminal 8 is also referred to simply as "displaying". Details of the server 1 and the information processing method executed by the server 1 will be discussed later. Note, here, that the "operation" is an operation performed by a user of the terminal 8. Further, the user of the terminal 8 is, for example, a manager who manages the state of the production plant F. Hereinafter, the user of the terminal 8 will be referred to as a manger. However, the user of the terminal 8 in accordance with the present embodiment is not limited to the manager.

As illustrated in FIG. 1, the server 1 includes an integrated service providing section 101, a data collecting section 102, a data passing section 103, and the app APPx. Details of these functional blocks will be discussed later.

Further, the server 1 is communicably connected to a gateway 7 and the terminal 8 via a network N1. The network N1 is a wide area network (WAN). A management device 6 and the gateway 7 are installed in the production plant F. For example, the terminal 8 may be a device installed at a remote location away from the production plant F, or may be a device carried by a manager who manages the state of the production plant F.

<Production Plant F>

The production plant F includes the production line L, the management device 6, and the gateway 7.

As illustrated in FIG. 1, the production line L includes a plurality of facilities Mi (i=1, 2, . . . ), a plurality of controllers MPi, a plurality of external sensors Cj (j=1, 2, . . . ), and a sensor master unit CP. The production line L is, as an example, a production line for castings. In this case, examples of the processes carried out on the production line L include a sand conditioning process, a molding process, a core setting process, a pouring process, a cooling/conveying process, and a post-processing process. Further, the production line L includes a sand conditioning facility M1, a molding facility M2, a core facility M3, a pouring facility M4, a conveyance facility M5, and a post-processing facility M6. The sand conditioning facility M1 carries out the sand conditioning process of processing foundry sand. The molding facility M2 carries out the molding process of forming a mold. The core facility M3 carries out the core setting process of setting a core in the mold. The pouring facility M4 carries out the pouring process of pouring molten metal into the mold. The cooling/conveyance facility M5 carries out the conveying process of cooling or conveying the mold. The post-processing facility M6 carries out the post-processing process after removal of a casting from the mold.

The facilities Mi have respective built-in controllers MPi. Each of the controllers MPi controls a corresponding one of the facilities Mi. The controller MPi is, as an example, a programmable logic controller (PLC) that operates according to a program for controlling each part of the facility Mi. Each controller MPi acquires information indicating the state of the facility Mi. Examples of the information that can be acquired by the controller MPi include, but not limited to, a power status of the facility Mi, a standby status of the facility Mi, information indicating the number of times a process of inspecting a predetermined part has been performed, an operating time of the predetermined part, a date and time when the predetermined part has been replaced, a processing time taken for a predetermined work, information measured by the built-in sensor, and the like.

Further, each controller MPi is connected to the management device 6 and the gateway 7, which will be discussed later, via a network N2. The network N2 is a local area network (LAN) laid in the production plant F. The network N2 is constituted by a wired LAN, a wireless LAN, or a combination of these LANs. Each controller MPi transmits information indicating the state of the facility Mi to the management device 6 or the gateway 7. Each controller MPi may periodically transmit these pieces of information to the management device 6 or the gateway 7, or may transmit these pieces of information in response to a request from the management device 6 or the gateway 7. Thus, as a route through which the information indicating the state of each piece of facility Mi is transferred to the server 1, there are the following routes (i) and (ii): (i) a route through which the information is transmitted from each controller MPi to the server 1 via the gateway 7; and (ii) a route through which the information is transmitted from each controller MPi to the server 1 via the management device 6 and the gateway 7 in this order. In the case of the route (ii), the information indicating the state of each facility Mi is processed into information on a target object by the management device 6, and is then transmitted to the server 1 via the gateway 7.

The plurality of sensors Cj include a sensor Cj which is attached to at least one of the plurality of facilities Mi and a sensor Cj which is not attached to any of the facilities Mi. Here, the phrase "attached to" means being retrofitted to the facility Mi to measure the state of the facility Mi. An installation location of the sensor Cj which is attached to any of the facilities Mi may be a location inside the corresponding facility Mi or may be a location outside the corresponding facility Mi. Further, the number of sensors Cj attached to one facility Mi is not limited to one and may be two or more. Further, among the plurality of facilities Mi, there may be any facility Mi to which the sensor Cj is not attached. The installation location of the sensor Cj which is not attached to any of the facilities Mi is a location outside the facility Mi. In the example in FIG. 1, sensors C1 and C2 are attached to the facility M1. A sensor C3 is attached to the facility M2. A sensor C4 is attached to the facility M3. A sensor C5 is not attached to any of the facilities Mi.

Each sensor Cj attached to any of the facilities Mi acquires information indicating the state of the corresponding facility Mi. Examples of the information that can be acquired from the sensor Cj attached to any of the facilities Mi include, but not limited to, information indicating a vibration of the facility Mi, information indicating a differential pressure between two rooms in the facility Mi (for example, a clean room and a dirty room in a dust collector), a motor current value for rotationally driving the part of the facility Mi, information indicating contamination of a hydraulic oil of the facility Mi, a temperature of molten metal poured into the facility Mi, and the like. Further, examples of the sensor Cj attached to any of the facilities Mi include, but not limited to, a vibration sensor, a current transformer (CT) sensor, a manometer, an oil deterioration sensor, a non-contact temperature sensor, and the like.

Each sensor Cj which is not attached to any of the facilities Mi acquires information indicating the state of surroundings of one or more facilities Mi. Examples of information that can be obtained from the sensor Cj which is not attached to any of the facilities Mi include, but not limited to, a temperature, a humidity, and the like. Further, examples of the sensor Cj which is not attached to any of the facilities Mi include, but not limited to, a sensor for detecting a surrounding atmosphere (for example, a temperature sensor, a humidity sensor, etc.).

In addition, each sensor Cj is communicably connected to the sensor master unit CP. As an example, each sensor Cj and the sensor master unit CP are connected to each other via a wireless sensor network. The wireless sensor network is constructed by, for example, short-range wireless communication such as infrared rays and Bluetooth (registered trademark). Further, information is transmitted and received between the sensor master unit CP and the sensor Cj in accordance with a predetermined protocol. In other words, any sensor Cj that has a communication interface which is connected to a wireless sensor network supported by the sensor master unit CP and transmits and receives information in accordance with a protocol supported by the sensor master unit CP, can easily be added in a retrofitted manner as the one attached to any of the facilities Mi.

The sensor Cj may be of a type that periodically measures information and transmits the information to the sensor master unit CP. Further, the sensor Cj may be a sensor of a type that, when having measured information which satisfies a predetermined condition, transmits the information to the sensor master unit CP. Further, the sensor Cj may be of a type that transmits, to the sensor master unit CP, information measured in response to a request from the sensor master unit CP.

The sensor master unit CP receives information, measured by each sensor Cj, indicating the state of the facility Mi or the state of surroundings of the facility Mi. Note that a timing at which the sensor master unit CP receives information from the sensor Cj is a timing determined according to the type of the sensor Cj described above. The sensor master unit CP stores, in a memory (not illustrated) of the sensor master unit CP, the information received from each sensor Cj in association with identification information of the sensor Cj.

In addition, the sensor master unit CP is connected to the gateway 7 via the network N2. The sensor master unit CP transmits the information measured by the sensor Cj to the gateway 7. The sensor master unit CP may periodically transmit these pieces of information to the management device 6 or the gateway 7, or may transmit these pieces of information in response to a request from the gateway 7. Thus, the information, measured by each sensor Cj, indicating the state of the facility Mi or the state of the surroundings of the facility Mi is transmitted to the server 1 via the sensor master unit CP and the gateway 7 in this order.

Note that although the production line L has one sensor master unit CP in the present embodiment, the production line L may include a plurality of sensor master units each configured in the same manner as the sensor master unit CP. In that case, each sensor Cj is connected to any of the plurality of sensor master units. Further, at least one of the plurality of sensor master units may be connected to a wireless sensor network which differs from a wireless sensor network to which at least one other sensor master unit is connected. Further, at least one of the plurality of sensor master units may communicate with each sensor Cj using a protocol which differs from a protocol for at least one other sensor master unit.

The management device 6 is a device that manages the status of each process carried out on the production line L. The management device 6 acquires information on the state of each facility Mi from each controller MPi, and generates information on a target object to be processed by each facility Mi based on the acquired information. The target object is, for example, foundry sand to be processed by the sand conditioning facility M1. Further, the target object is, for example, a mold targeted by the molding facility M2. Further, the target object is, for example, molten metal to be processed by the pouring facility M4. However, the target object is not limited to the above-described examples. The information on the target object includes, for example, information indicating the quality of the target object and information indicating the production status of the target object. Further, the management device 6 generates a management screen including information on the target object. Further, the management device 6 displays the generated management screen on a display (not illustrated) installed in the production plant F. Note that the display on which the management screen generated by the management device 6 is displayed may be connected to the management device 6 or may be connected to the network N2 which is a LAN in the production plant F.

Further, the management device 6 is communicably connected to the terminal 8 via the network N1. The management device 6 transmits the above-described management screen in response to a request from the terminal 8 and displays the management screen on the terminal 8.

Further, it is desirable that the management device 6 collects information indicating the state of the facility Mi in real time while the production line L is in operation. The real-time collection is realized by, for example, an operation which is performed at a predetermined interval or in accordance with detection of information. For example, the management device 6 may receive the information by making a request of the controller MPi for the information at a predetermined interval. Further, the controller MPi may be configured to transmit the detected information to an external entity at a predetermined interval. The management device 6 collects information indicating the state of the facility Mi in real time, and updates the management screen according to the collected information.

Further, the management device 6 transmits, to the server 1 via the gateway 7, part or all of pieces of the information on the target object which has been generated based on the information acquired from each controller MPi. For example, the management device 6 periodically transmits the information to the gateway 7, and the gateway 7 transmits the information received from the management device 6 to the server 1.

The gateway 7 is a device that transmits the information collected from the management device 6, each controller MPi, and the sensor master unit CP to the server 1. It is desirable that the gateway 7 collects and transmits these pieces of information in real time while the production line L is in operation.

The following description will discuss collection of these pieces of information by the gateway 7 in real time. The real-time collection is performed, for example, at a predetermined interval. For example, the gateway 7 may receive the information on the target object by making a request of the management device 6 for the information at a predetermined interval. Further, the gateway 7 may receive the information indicating the state of the facility Mi by making a request of the controller MPi for the information at a predetermined interval. Further, the gateway 7 may receive information indicating the state of the facility Mi or the state of the surroundings of the facility Mi by making a request of the sensor master unit CP for the information at a predetermined interval. Note that the predetermined interval at which the gateway 7 collects the information may be determined in correspondence with the management device 6, each controller MPi, and the sensor master unit CP.

The following description will discuss transmission of the collected information by the gateway 7 to the server 1 in real time. Such real-time transmission is realized by, for example, an operation which is performed at a predetermined interval or in accordance with reception of information. For example, the gateway 7 may accumulate information received from the management device 6, the controller MPi, and the sensor master unit CP in a memory (not illustrated) and transmit the accumulated information to the server 1 at a predetermined interval. Further, the gateway 7 may transmit the information to the server 1 each time the gateway 7 receives the information from the management device 6, the controller MPi, or the sensor master unit CP. In this way, the gateway 7 collects, in real time, information indicating the state of the facility Mi or the state of surroundings of the facility Mi, and transmits the collected information to the server 1 in real time. Note that in a case where the gateway 7 transmits the information at a predetermined interval, the predetermined interval may be set to lengths that are determined in correspondence with the management device 6, each controller MPi, and the sensor master unit CP. Further, the predetermined interval at which the gateway 7 transmits the information collected from each device does not necessarily have to be of the same length as the interval at which the information is collected from the corresponding device.

<Physical Configuration Example of Server 1>

Figure 2:
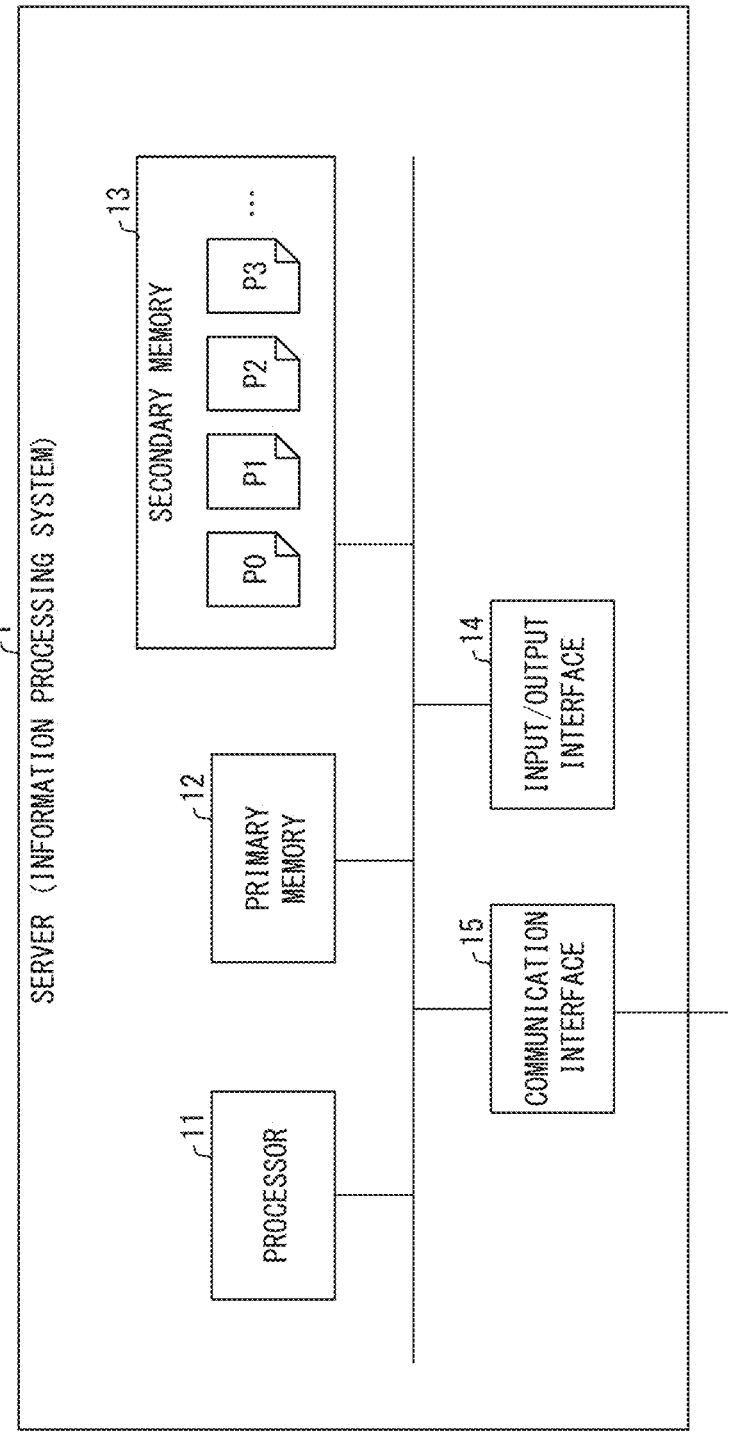
FIG. 2 is a block diagram illustrating an example of a physical configuration of the server illustrated in FIG. 1.

A physical configuration example of the server 1 will be discussed with reference to FIG. 2. FIG. 2 is a block diagram illustrating an example of the physical configuration of the server 1. As illustrated in FIG. 2, the server 1 includes a processor 11, a primary memory 12, a secondary memory 13, an input/output interface 14, and a communication interface 15. The processor 11, the primary memory 12, the secondary memory 13, the input/output interface 14, and the communication interface 15 are mutually connected to one another via a bus.

The secondary memory 13 stores programs P0, P1, P2, . . . . The program P0 is a program for causing the processor 11 to execute the information processing method in accordance with the present embodiment. The program Px (x=1, 2, . . . ) is a program to be executed by the processor 11 to realize the function of the app APPx. The processor 11 executes each step included in the information processing method in accordance with the present embodiment, in accordance with instructions included in the program P0. Further, the processor 11 realizes the function of the app APPx by executing the instructions included in the program Px.

Examples of a device that can be used as the processor include a central processing unit (CPU), a graphic processing unit (GPU), or a combination of the CPU and the GPU.

Further, examples of a device that can be used as the primary memory 12 include a semiconductor random access memory (RAM). Further, examples of a device that can be used as the secondary memory 13 include a flash memory, a hard disk drive (HDD), a solid state drive (SSD), or a combination of the HDD and the SSD.

To the input/output interface 14, an input device and/or an output device is/are connected. Examples of the input/output interface 14 include interfaces such as a universal serial bus (USB).

To the communication interface 15, other computers are connected by wire or wirelessly via the network N1. Here, at least the management device 6, the gateway 7, and the terminal 8 are connected as the other computers. Examples of the communication interface 15 include interfaces such as Ethernet (registered trademark) and Wi-Fi (registered trademark).

Note that in the present embodiment, the configuration in which the information processing method in accordance with the present embodiment is executed using a single processor (processor 11) is employed for the server 1, but the present invention is not limited to this configuration. That is, a configuration may be employed in which the information processing method is executed using a plurality of processors.

<Details of Functional Configuration of Server 1>

The app APPx realizes the function of managing the state of the production line L by the processor 11 operating in accordance with the program Px. Specifically, the app APPx acquires information from the production line L via the data collecting section 102, which will be described later, and generates, based on the acquired information, a second screen including information indicating the state of the production line L. Hereinafter, the second screen is also referred to as an "app screen".

Further, the app APPx displays the generated app screen on the display of the terminal 8. The app screen is displayed in, for example, a window (application area) included in the display screen of the terminal 8. As a result, the app APPx provides the terminal 8 with a function of remotely checking the state of the production line L.

Further, the app APPx outputs the information contained in the app screen to the data passing section 103, which will be described later. The structure of the output information from the app APPx to the data passing section 103 is determined in advance. For example, the output information includes information itself acquired from the production line L. Further, the output information includes information (for example, statistical values, graphs, etc.) obtained by processing the information from the production line L.

In the present embodiment, an app APP1 is a quality control application and performs quality control of the target object in each process carried out on the production line L. The target object in each process is a target object to be processed by the facility Mi corresponding to each process. Specifically, the app APP1 acquires information on the target object generated by the management device 6 via the data collecting section 102, which will be described later. The information on the target object includes information indicating the quality of the target object and information indicating the production status of the target object. The app APP1 uses the information on the target object to generate an app screen regarding the quality of the target object in each process. Note that the present embodiment can be modified to employ the quality control screen generated by the management device 6 instead of the app screen generated by the app APP1. Details of an aspect modified in this way will be discussed later.

Further, an app APP2 is a facility operation application and monitors the operating status of each facility Mi. For example, the app APP2 acquires the information collected by the gateway 7 via the data collecting section 102, which will be described later, and uses the acquired information to generate an app screen showing the operating status of each facility Mi.

Apps APP3, APP4, . . . include, for example, part or all of a maintenance application for maintaining and managing each facility Mi, a safety environment application for managing the safety and environment of the production line L, and a productivity application for managing the productivity of the production line L. However, the app APPx is not limited to the above-described applications.

The integrated service providing section 101 is a functional block that executes the information processing method in accordance with the present embodiment through the processor 11 operating in accordance with the program P0. The integrated service providing section 101 displays the first screen and the second screen by executing the information processing method. Details of the information processing method will be discussed later.

The data collecting section 102 is a functional block that collects information indicating the state of each facility Mi included in the production line L or the state of surroundings of each facility Mi via the network N1. Specifically, the data collecting section 102 receives, via the network N1, the information transmitted from the gateway 7. It is desirable that the reception of the information is performed in real time while the production line L is in operation. The data collecting section 102 is realized by a known Internet of Things (IoT) platform. Examples of such an IoT platform include a group of software modules that collect information from an IoT device via a network and utilize the collected information. In other words, the data collecting section 102 is realized by the processor 11 executing part or all of the group of software modules included in the IoT platform.

The data passing section 103 is a functional block that performs transmission and reception of information between the integrated service providing section 101 and the app APPx. The data passing section 103 is realized by the processor 11 executing part or all of the group of software modules included in an IoT platform similar to that of the data collecting section 102.

<Information Processing Method in Accordance with the Present Embodiment>

Figure 3:
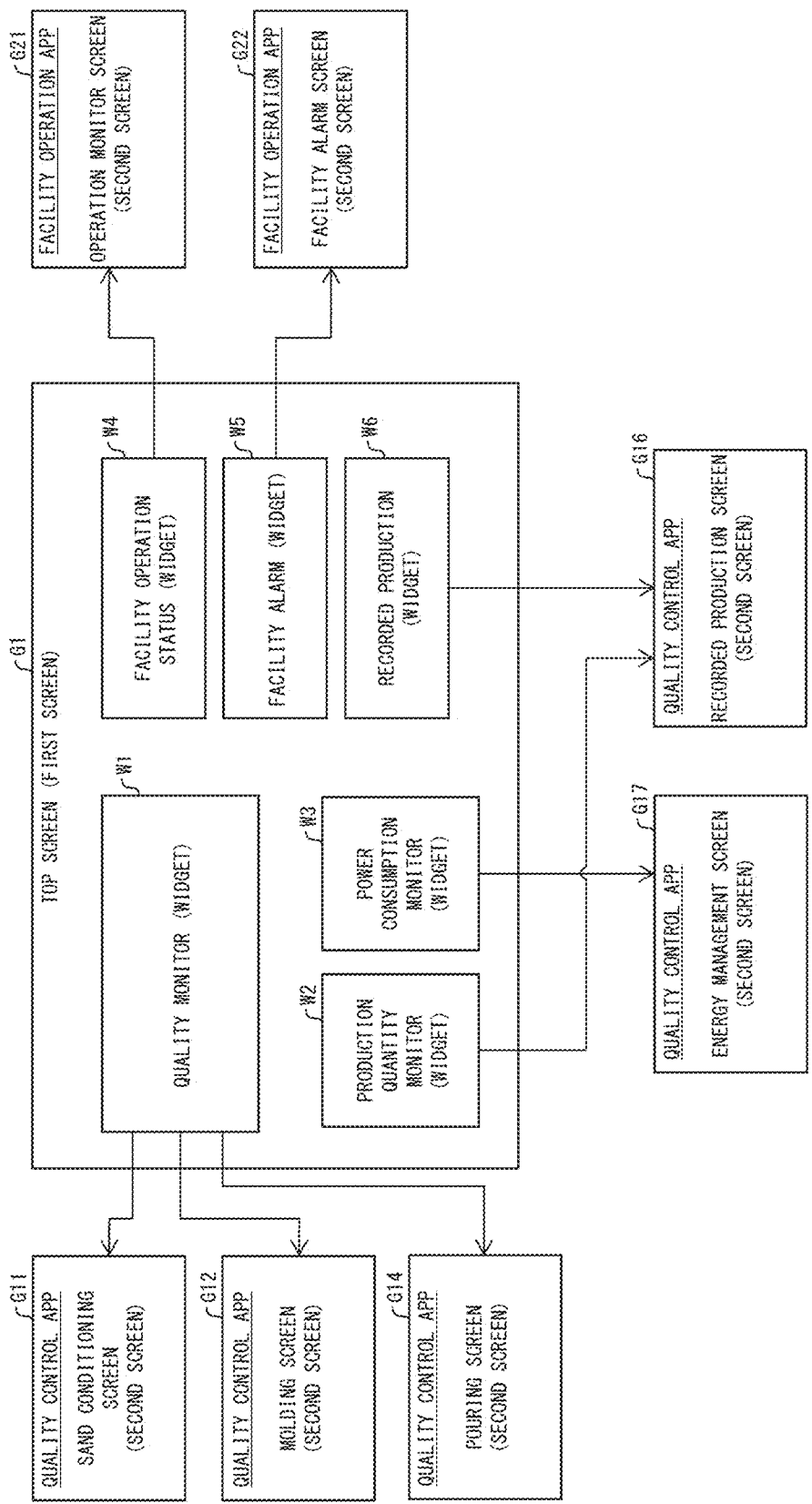
FIG. 3 is a diagram illustrating an example of transitions between screens displayed by an information processing method in accordance with Embodiment 1.
Figure 4:
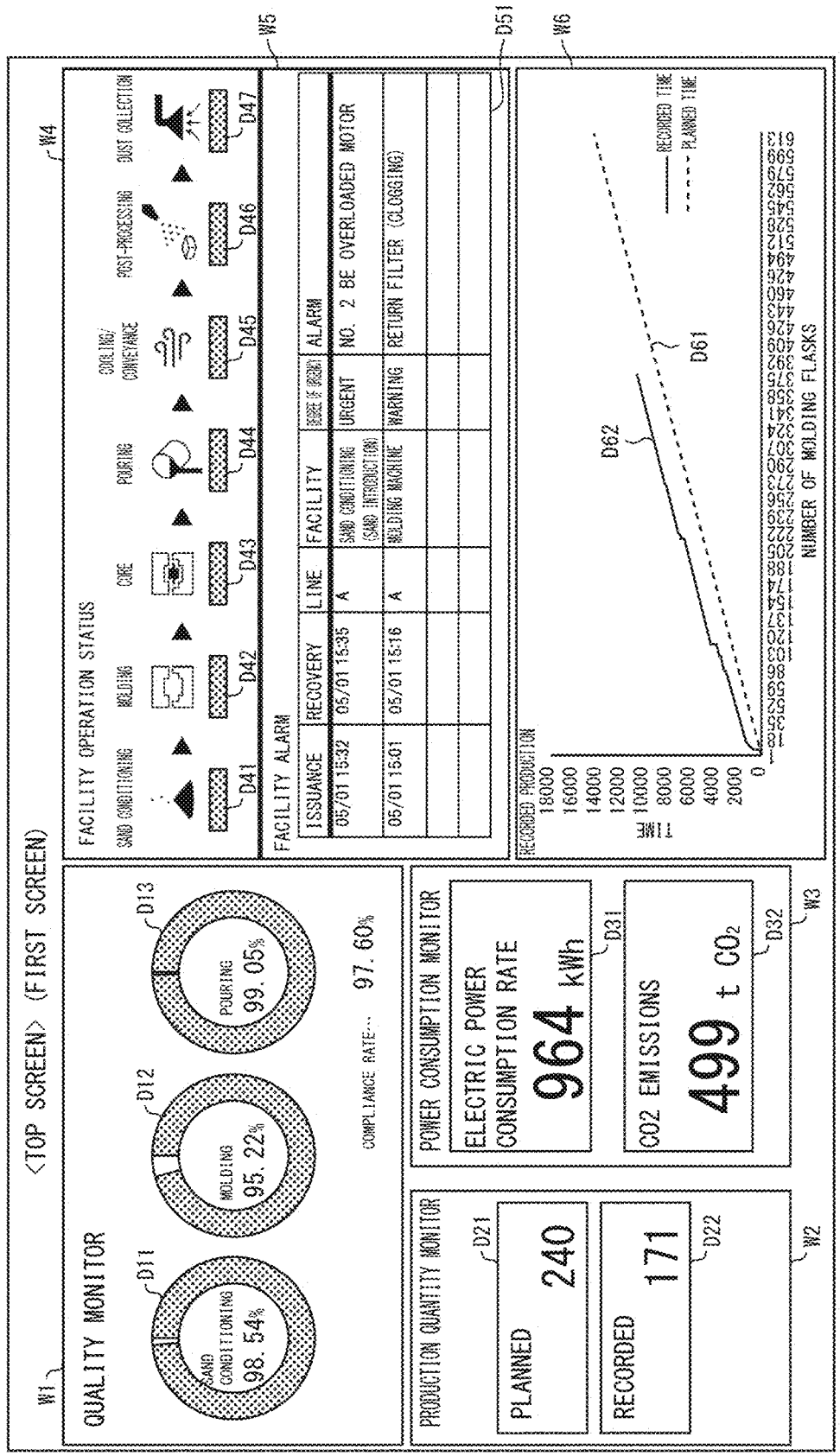
FIG. 4 is a view illustrating a specific example of a first screen in accordance with Embodiment 1.
Figure 5:
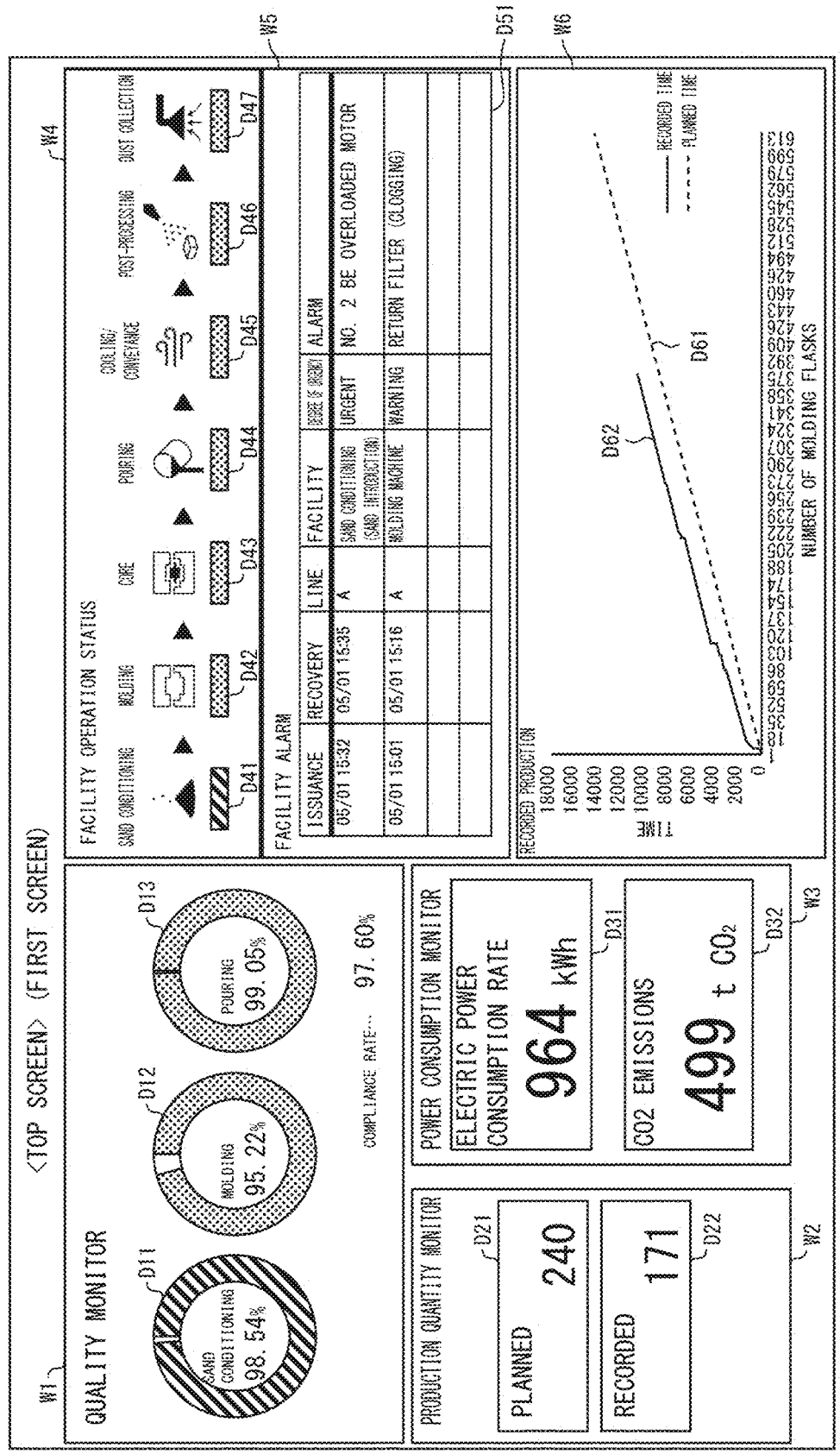
FIG. 5 is a view illustrating another specific example of a first screen in accordance with Embodiment 1.
Figure 6:
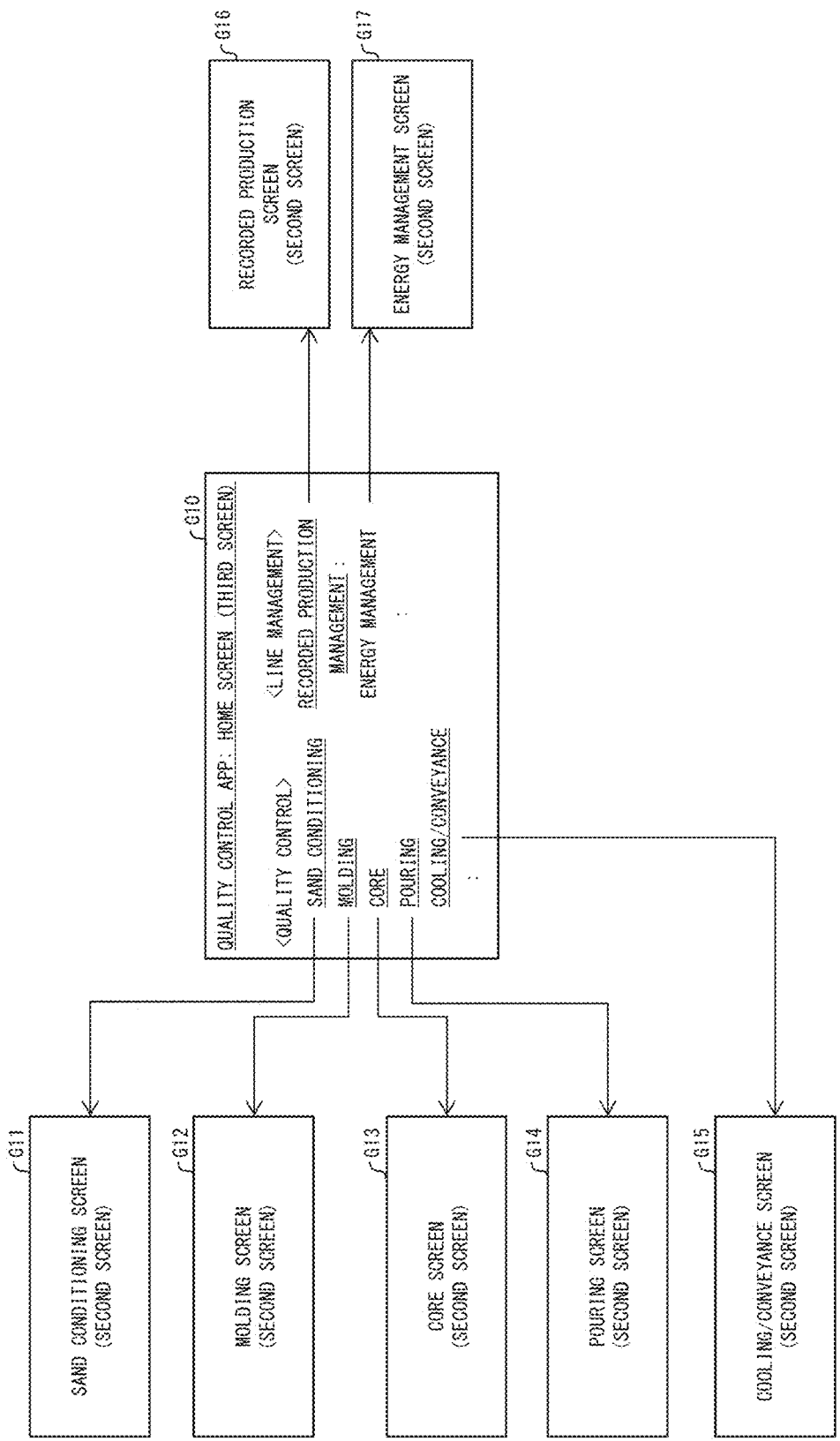
FIG. 6 is a diagram illustrating an example of transitions between a plurality of screens generated by application software in Embodiment 1.

The information processing method in accordance with the present embodiment includes a first screen displaying step and a second screen displaying step. The details of the information processing method will be discussed with reference to FIGS. 3 to 13. FIG. 3 is a diagram illustrating an example of transitions between screens displayed by the information processing method. FIGS. 4 and 5 are views illustrating a specific example of the first screen. FIGS. 6 and 11 are diagrams illustrating an example of transitions between a plurality of screens generated by the apps APP1 and APP2. FIGS. 7 to 10 and FIGS. 11 to 13 are views illustrating specific examples of app screens generated by the apps APP1 and APP2.

In the first screen displaying step, the integrated service providing section 101 displays the first screen including a plurality of widgets. Each widget is configured based on information outputted from an app APPx associated with the widget among the plurality of apps APPx. Here, the apps APPx associated with respective ones of the plurality of widgets can be all the same. Further, the apps APPx associated with respective ones of at least two of the plurality of widgets can differ from each other. Hereinafter, the first screen is also referred to as a "top screen".

Here, the widget is a constituent component of a screen, and is configured for each purpose for collectively grasping the state of the production line L. For example, each widget may include information that summarizes information outputted from a corresponding app APPx, may include processed information, or may include the outputted information as it is.

Here, a plurality of widgets included in the top screen are designed in advance according to a manager's purpose. Further, the plurality of widgets included in the top screen can be changed according to the manager's purpose after the start of operation. For example, information displayed by some or all of the plurality of widgets can be changed. Further, the layout of the plurality of widgets included in the top screen can be changed. Further, a change to add a new widget can be made to the top screen. Further, a change to delete any of the plurality of widgets included in the top screen can be made. Hereinafter, the plurality of widgets included in the top screen will be discussed with reference to FIGS. 3 to 5. As illustrated in FIGS. 3 to 5, a top screen G1 includes widgets W1 to W6.

As illustrated in FIGS. 3 to 5, a widget W1 provides a function of monitoring the quality of a target object in each process of the production line L. The widget W1 is associated with the app APP1. The widget W1 contains pieces of information D11 to D13. The information D11 indicates a non-defective rate of the target object (foundry sand) in the sand conditioning process. The information D12 indicates a non-defective rate of the target object (mold) in the molding process. The information D13 indicates a non-defective rate of the target object (molten metal) in the pouring process. These pieces of information D11 to D13 are pieces of information into which information outputted from the app APP1 (quality control application) has been processed.

Specifically, the app APP1 outputs information indicating whether or not the target object in each process is a non-defective product to the integrated service providing section 101 via the data passing section 103. The integrated service providing section 101 generates the pieces of information D11 to D13 by calculating the non-defective rates per unit period based on the outputted information. Here, the widget W1 illustrated in FIGS. 4 to 5 indicates that a non-defective rate in the sand conditioning process is 98.54%, a non-defective rate in the molding process is 95.22%, and a non-defective rate in the pouring process is 99.05%.

Further, the app APP1 outputs information indicating whether or not an abnormality has occurred in each process to the integrated service providing section 101 via the data passing section 103. Based on the outputted information, the integrated service providing section 101 sets information corresponding to a process in which an abnormality has occurred, among the pieces of information D11 to D13, to be an "abnormality-indicating display mode", and sets the other piece(s) of information to be a "normality-indicating display mode". For example, in the examples illustrated in FIGS. 4 and 5, the abnormality-indicating display mode is represented by a diagonal line pattern, and the normality-indicating display mode is represented by a dot pattern. Here, the widget W1 illustrated in FIG. 4 indicates that each process is normal, and the widget W1 illustrated in FIG. 5 indicates that an abnormality has occurred in the sand conditioning process, and the molding process and the pouring process are normal.

As illustrated in FIGS. 3 to 5, a widget W2 provides a function of monitoring the number of castings produced on the production line L. The widget W2 is associated with the app APP1. The widget W2 contains pieces of information D21 and D22. The information D21 indicates a planned production quantity of castings per unit period (for example, one day) on the production line L. The information D22 indicates an actual production quantity of castings in the unit period. The pieces of information D21 and D22 are pieces of information outputted from the app APP1.

Specifically, the app APP1 outputs the planned production quantity and the actual production quantity per unit period on the production line L to the integrated service providing section 101 via the data passing section 103. The integrated service providing section 101 uses the pieces of information outputted from the app APP1 as they are and sets them as the pieces of information D21 to D22. The widget W2 illustrated in FIGS. 4 and 5 indicates that the planned production quantity is 240 and the actual production quantity is 171.

As illustrated in FIGS. 3 to 5, the widget W3 provides a function of monitoring the power consumption of the production line L. The widget W3 contains pieces information D31 and D32. The information D31 indicates the current power consumption of the production line L. The information D32 indicates the amount of carbon dioxide emissions corresponding to the current power consumption. The pieces of information D31 and D32 are based on the information outputted from the data collecting section 102.

Specifically, the integrated service providing section 101 uses the power consumption outputted from the data collecting section 102 as it is and sets it as the information D31. Further, the integrated service providing section 101 calculates the amount of carbon dioxide emissions with reference to the power consumption outputted from the data collecting section 102, and generates the information D32. Here, the widget W3 illustrated in FIGS. 4 and 5 indicates that the power consumption is 964 kWh (kilowatt hour) and the amount of carbon dioxide emissions is 499 t (ton).

Note that as described above, the widget W3 is configured based on the information outputted from the data collecting section 102, not based on the information outputted from any of the apps APPx. As described above, the top screen G1 may include the widget W3 which is not configured based on the information outputted from any of the apps APPx.

As illustrated in FIGS. 3 to 5, a widget W4 provides a function of monitoring the operating status of the facility Mi. The widget W4 is associated with the app APP2. The widget W4 contains pieces of information D41 to D47. The pieces of information D41 to D47 indicate whether or not there is an abnormality in the operating status of the facility in each process. These pieces of information D41 to D47 are pieces of information into which the information outputted from the app APP2 (facility operation application) has been processed.

Specifically, the app APP2 outputs information indicating the operating status of each facility Mi to the integrated service providing section 101 via the data passing section 103. In this example, the operating status is represented by the following four stages: "operating", "abnormal", "standby", and "stopping". The integrated service providing section 101 identifies the facility Mi whose operating status is "abnormal" based on the outputted information. Further, the integrated service providing section 101 sets information corresponding to a process in which the identified facility Mi is included, among the pieces of information D41 to D47, to be an "abnormality-indicating display mode", and sets the other piece(s) of information to be a "normality-indicating display mode". For example, in the examples illustrated in FIGS. 4 and 5, the abnormality-indicating display mode is represented by a diagonal line pattern, and the normality-indicating display mode is represented by a dot pattern. Here, the widget W4 illustrated in FIG. 4 indicates that the facility Mi in each process is normal, and the widget W4 illustrated in FIG. 5 indicates that an abnormality has occurred in the facility Mi in the sand conditioning process, and the facilities Mi in the other processes are normal.

As illustrated in FIGS. 3 to 5, a widget W5 provides a function of managing the issuance status of facility alarms on the production line L. The widget W5 is associated with the app APP2. Here, the facility alarm is information for making a notification of the occurrence of an abnormality in the facility Mi, and includes information indicating the degree of urgency. In this example, the degree of urgency is represented in the following three stages: "urgent", "abnormal", and "caution" in decreasing order of urgency. The widget W5 contains information D51. The information D51 indicates the issuance history of the facility alarms on the production line L. The information D51 is information outputted from the app APP2.

Specifically, the app APP2 outputs information indicating the history of facility alarms to the integrated service providing section 101 via the data passing section 103. The integrated service providing section 101 uses the outputted information as it is and sets it as the information D51. Here, the widget W5 illustrated in FIGS. 4 and 5 indicates, for example, that recovery was done at 15:35 on May 1 from the issuance of a facility alarm indicating that the degree of urgency is "urgent" at 15:32 on May 1 in the sand conditioning facility.

As illustrated in FIGS. 3 to 5, a widget W6 provides a function of managing recorded production on the production line L. The widget W6 is associated with the app APP1. The widget W6 contains information D61. The information D61 indicates a planned production time with respect to the number of molding flasks, and the information D62 indicates a recorded production time with respect to the number of molding flasks. The pieces of Information D61 and D62 are pieces of information outputted from the app APP1.

Specifically, the app APP1 outputs the planned production time and the recorded production time on the production line L to the integrated service providing section 101 via the data passing section 103. The integrated service providing section 101 uses the outputted pieces of information as they are and sets them as the pieces of information D61 and D62.

In this way, the widgets W1, W2, and W6 are associated with the same app APP1 (quality control application). Further, the widgets W4 and W5 are associated with the same app APP2 (facility operation application).

In the second screen displaying step, when the integrated service providing section 101 accepts an operation performed on any of a plurality of widgets, the integrated service providing section 101 identifies the app APPx associated with the widget on which the operation has been performed. Further, the integrated service providing section 101 controls the identified app APPx to display the app screen generated by the app APPx. Note that the second screen displaying step can be modified to display the quality control screen provided by the management device 6 instead of the app screen generated by the app APP1. Details of an aspect modified in this way will be discussed later.

In the examples illustrated in FIGS. 3 to 5, the widget W1 is associated with the app APP1. Thus, when the operation performed on the widget W1 has been accepted, the integrated service providing section 101 controls the app APP1 to display any of the app screens G11, G12, and G14 of the app APP1. For example, an app screen G11 as a transition destination is associated with the information D11. Further, an app screen G12 as a transition destination is associated with the information D12. Further, an app screen G14 as a transition destination is associated with the information D13. When an operation performed on the information D11 (non-defective rate in the sand conditioning process) has been accepted, the integrated service providing section 101 controls the app APP1 to display the app screen G11 (sand conditioning screen). Further, when an operation performed on the information D12 (non-defective rate in the molding process) has been accepted, the integrated service providing section 101 controls the app APP1 to display the app screen G12 (molding screen). Further, when an operation performed on the information D13 (non-defective rate in the pouring process) has been accepted, the integrated service providing section 101 controls the app APP1 to display the app screen G14 (pouring screen). As a result, the top screen G1 transitions to any of the app screens G11, G12, and G14.

Further, in the examples illustrated in FIGS. 3 to 5, the widget W2 is associated with the app APP1. Further, an app screen G16 of the app APP1 as a transition destination is associated with the widget W2. Thus, when an operation performed on the widget W2 has been accepted, the integrated service providing section 101 controls the app APP1 to display the app screen G16 (recorded production screen) of the app APP1. As a result, the top screen G1 transitions to the app screen G16.

Further, in the examples illustrated in FIGS. 3 to 5, the widget W3 is configured based on the information outputted from the data collecting section 102, not from any of the apps APPx. However, an app screen G17 (energy management screen) of the app APP1 as a transition destination corresponding to the operation is associated with even such a widget W3. When the operation performed on the widget W3 has been accepted, the integrated service providing section 101 controls the app APP1 to display the app screen G17. As a result, the top screen G1 transitions to the app screen G17.

Further, in the examples illustrated in FIGS. 3 to 5, the widget W4 is associated with the app APP2. Further, an app screen G21 of the app APP2 as a transition destination is associated with the widget W4. Thus, when an operation performed on the widget W4 has been accepted, the integrated service providing section 101 controls the app APP2 to display the app screen G21 (operation monitor screen). As a result, the top screen G1 transitions to the app screen G21.

Further, in the examples illustrated in FIGS. 3 to 5, the widget W5 is associated with the app APP2. Further, an app screen G22 of the app APP2 as a transition destination is associated with the widget W5. Thus, when an operation performed on the widget W5 has been accepted, the integrated service providing section 101 controls the app APP2 to display the app screen G22 (facility alarm screen). As a result, the top screen G1 transitions to the app screen G22.

Further, in the examples illustrated in FIGS. 3 to 5, the widget W6 is associated with the app APP1. Further, the app screen G16 of the app APP1 as a transition destination is associated with the widget W6. Thus, when an operation performed on the widget W6 has been accepted, the integrated service providing section 101 controls the app APP1 to display the app screen G16 (recorded production screen). As a result, the top screen G1 transitions to the app screen G16.

Note that the app screens of the apps APPx as the transition destinations associated with the widgets W1 to W6 are app screens related to the information outputted from the apps APPx to configure the widgets.

Further, the app screens as the transition destinations associated with the widgets W1 to W6 are app screens to which transition can be made from a third screen in the apps APPx associated with the widgets. The third screen is one of a plurality of app screens generated by the app APPx, and is a screen from which a transition can be made to at least one other app screen. For example, the third screen may be a home screen of the app APPx. Hereinafter, the third screen is also referred to as a home screen, but the third screen is not limited to the home screen. The home screen includes a user interface (UI) object for transitioning to another app screen. Hereinafter, the app screen to which a transition can be made from the home screen is also referred to as a lower app screen. The lower app screen is not necessarily limited to the app screen to which a transition is made directly from the home screen, and may be further another app screen to which a transition is made from the home screen via one other app screen or a plurality of other app screens. The transition from the home screen to the lower app screen will be discussed with reference to FIGS. 6 to 13.

FIG. 6 is a diagram illustrating an example of transitions between a plurality of screens generated by the app APP1. As illustrated in FIG. 6, the app APP1 (quality control application) generates a home screen G10 and lower app screens G11 to G17. The home screen G10 includes menu items for transitioning to the lower app screens G11 to G17. When the app APP1 accepts an operation performed on each menu item on the home screen G10, the app APP1 displays a corresponding one of the lower app screens G11 to G17.

Figure 7:
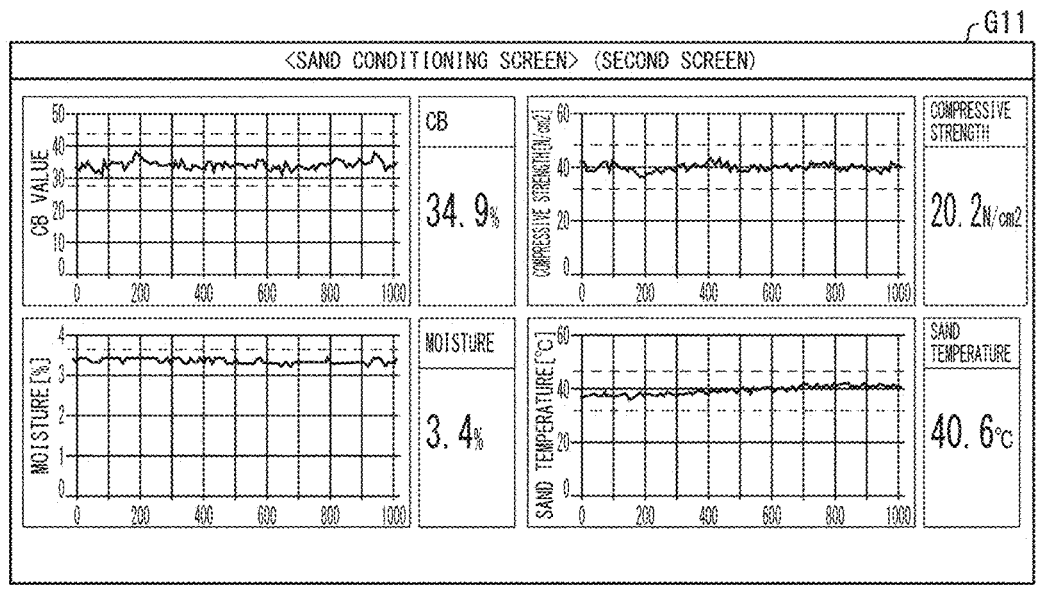
FIG. 7 is a view illustrating an example of a second screen generated by the application software illustrated in FIG. 6.

FIG. 7 is a view illustrating an example of the lower app screen G11 (sand conditioning screen). As illustrated in FIG. 7, the app screen G11 includes four graphs showing respective time-series changes in compactability (CB), moisture, sand temperature, and compressive strength, and average values of these four parameters in the most recent unit period. The CB, moisture, sand temperature and compressive strength are examples of information indicating the state of the sand conditioning process.

Figure 8:
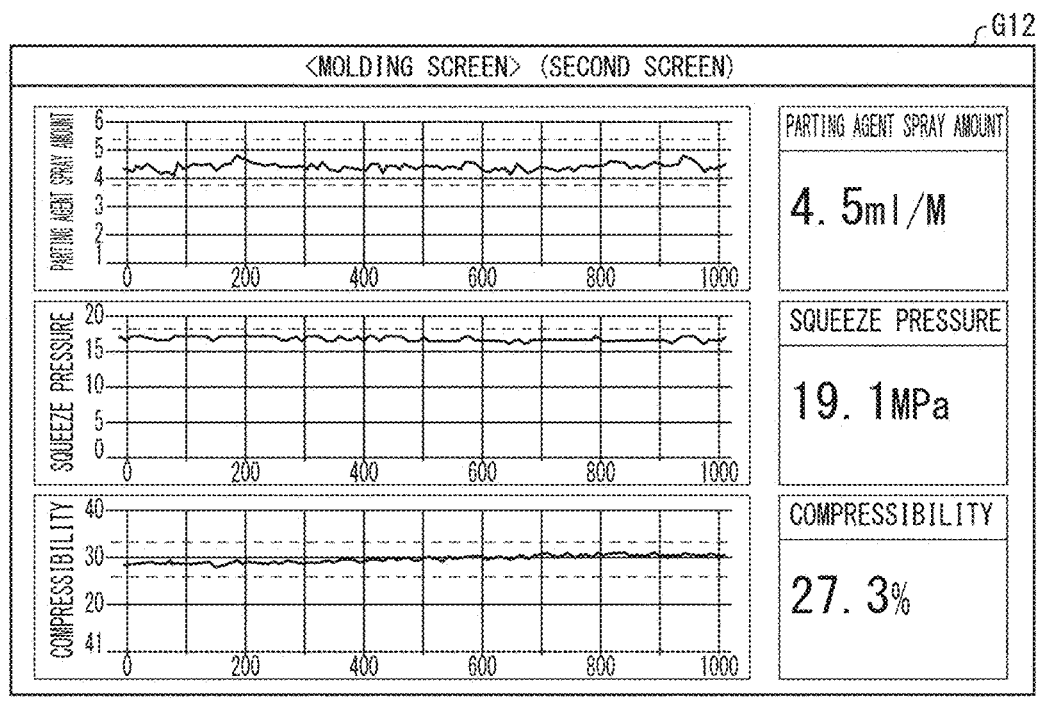
FIG. 8 is a view illustrating another example of the second screen generated by the application software illustrated in FIG. 6.

FIG. 8 is a view illustrating an example of the lower app screen G12 (molding screen). As illustrated in FIG. 8, the app screen G12 includes three graphs showing respective time-series changes in parting agent spray amount, squeeze pressure, and compressibility, and the average values of these three parameters in the most recent unit period. The parting agent spray amount, squeeze pressure, and compressibility are examples of information indicating the state of the molding process.

Figure 9:
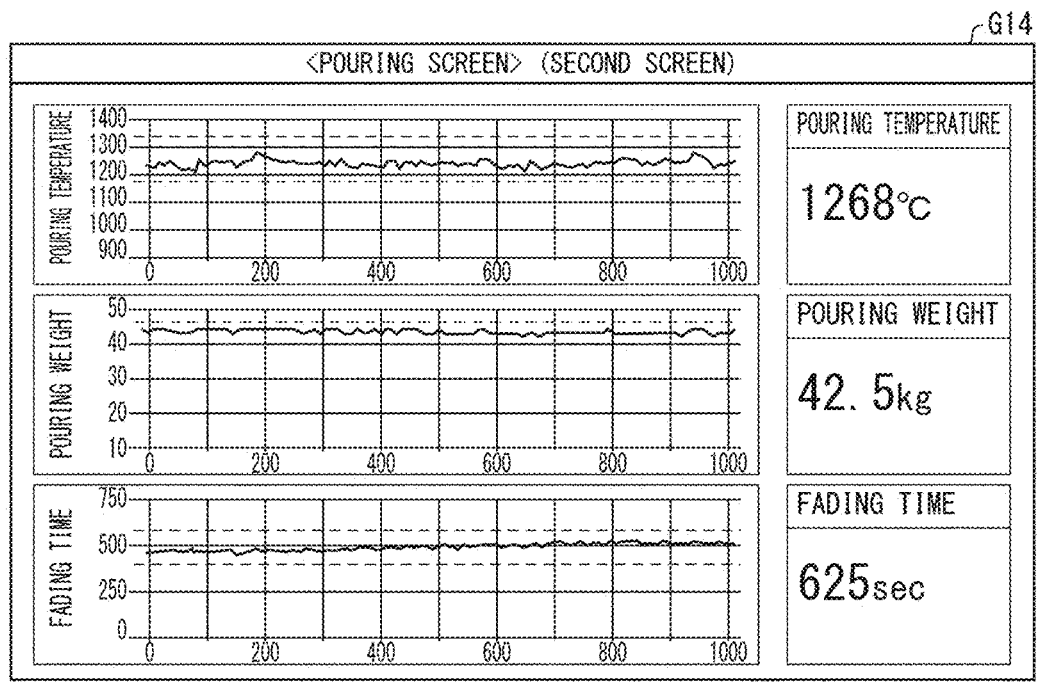
FIG. 9 is a view illustrating still another example of the second screen generated by the application software illustrated in FIG. 6.

FIG. 9 is a view illustrating an example of the lower app screen G14 (pouring screen). As illustrated in FIG. 9, the app screen G14 includes three graphs showing respective time-series changes in pouring temperature, pouring weight, and fading time, and average values of these three parameters in the most recent unit period. The pouring temperature, pouring weight, and fading time are examples of information indicating the state of the pouring process.

Figure 10:
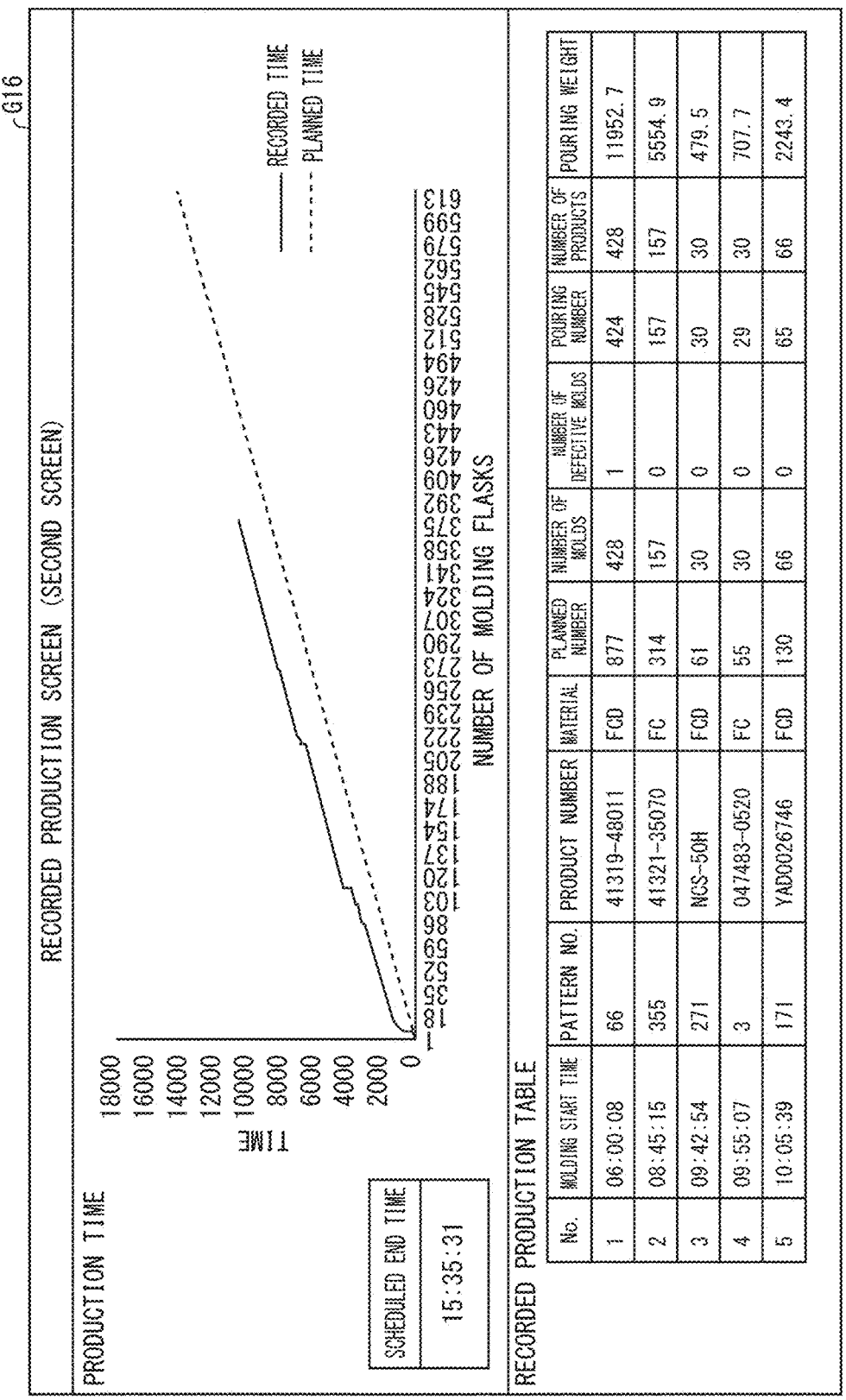
FIG. 10 is a view illustrating yet another example of the second screen generated by the application software illustrated in FIG. 6.
Figure 11:
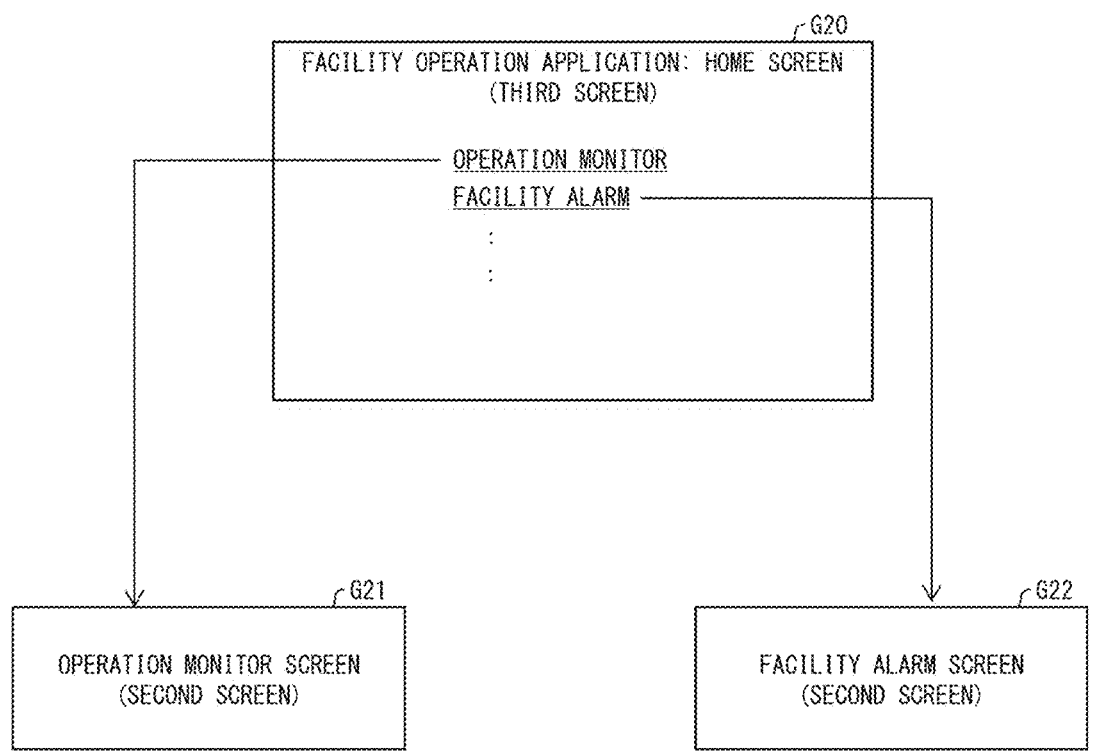
FIG. 11 is a diagram illustrating an example of transitions between a plurality of screens generated by another application software in Embodiment 1.

FIG. 10 is a view illustrating an example of the lower app screen G16 (recorded production screen). As illustrated in FIG. 10, the app screen G16 includes a graph showing the planned production time and the recorded production time, a scheduled end time, and a recorded production table. These pieces of information are examples of information indicating the production status on the production line L.

As described above, the integrated service providing section 101 controls the app APP1 according to the operation performed on the widgets W1, W2, W3, and W6 included in the top screen G1, so that any of the lower app screens G11, G12, G14, G16, and G17 is displayed. This allows the manager to directly transition from the top screen G1 to the lower app screens G11, G12, G14, G16, and G17, without going through the home screen G10 of the app APP1, and browse these app screens.

FIG. 11 is a diagram illustrating an example of transitions between a plurality of screens generated by the app APP2. As illustrated in FIG. 11, the app APP2 (facility operation application) generates a home screen G20 and lower app screens G21 to G22. The home screen G20 includes menu items for transitioning to the lower app screens G21 to G22. When the app APP2 accepts an operation performed on each menu item on the home screen G20, the app APP2 displays a corresponding one of the lower app screens G21 to G22.

Figure 12:
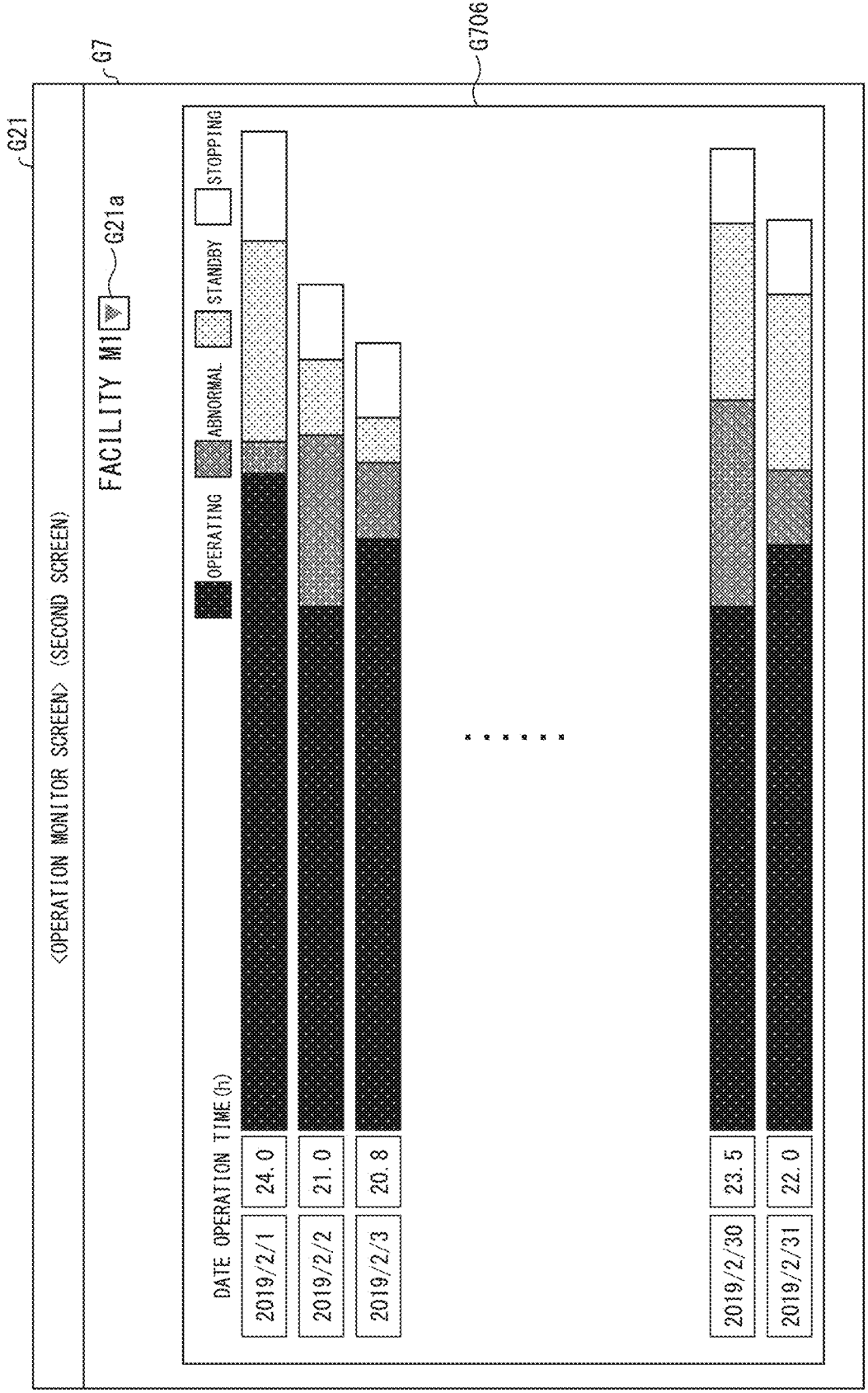
FIG. 12 is a view illustrating an example of a second screen generated by the application software illustrated in FIG. 11.

FIG. 12 is a view illustrating an example of the lower app screen G21 (operation monitor screen). As illustrated in FIG. 12, the app screen G21 includes a graph showing the operating status of a specific facility Mi for each unit period (here, one day). Each bar graph shows the lengths of time during which the operating status in the unit period was "operating", "abnormal", "standby", and "stopped". Further, the app APP2 generates the app screen G21 for each of the plurality of facilities Mi. The app screen G21 includes a facility selection button G21a. The app APP2 generates the corresponding app screen G21 for the facility Mi selected according to the operation performed on the button 21a. Such information indicating the operating status is an example of the information indicating the state of the facility Mi.

FIG. 13 is a view illustrating an example of the lower app screen G22 (facility alarm screen). As illustrated in FIG. 13, the app screen G22 includes the issuance history of the facility alarms on the production line L. Each facility alarm includes information indicating a date and time of issuance, a date and time of recovery, the degree of urgency, the content of the abnormality, and a status of handling. Such a facility alarm includes an example of information indicating the state of the facility Mi.

As described above, the integrated service providing section 101 controls the app APP2 according to the operation performed on the widgets W4 and W5 included in the top screen G1 and displays any of the lower app screens G21 and G22. This allows the manager to directly transition from the top screen G1 to the lower app screens G21 and G22, without going through the home screen G20 of the app APP2, and browse these app screens.

Effect of the Present Embodiment

The server 1 and the information processing method in accordance with the present embodiment display a top screen including a plurality of widgets. Each widget is configured based on the information outputted from the app APPx associated with the widget among the plurality of apps APPx that manage the state of the production line L. This allows the manager to collectively grasp the state of the production line L, without starting a plurality of apps APPx separately.

Specifically, the user can collectively grasp the state of the production line L without individually browsing the plurality of apps APPx that manage the production line L. Further, when the user wants to check the details of the information grasped on the top screen, the user can browse the app screen generated by the app APPx, without separately starting the related app APPx.

Further, since at least two widgets are associated with the same app APPx, the user can collectively grasp, through the above-described at least two widgets, a plurality of pieces of information obtained from the same app APPx regarding the state of the production line L.

Further, the server 1 and the information processing method in accordance with the present embodiment display, according to the operations performed on such widgets, the lower app screens of the app APPx associated with the widgets. Thus, in a case where the manager wants to check details of the information grasped on the top screen, the manager can browse the lower app screen of the related APPx, without the need to start the related app APPx separately and without the need to go through the home screen of the related app APPx. As a result, the convenience of the manager is increased.

Further, in the server 1 and the information processing method in accordance with the present embodiment, it is possible to design a plurality of widgets to be included in the top screen in advance or change the widgets after operation. This makes it possible to provide the manager with a top screen that meets a manager's purpose.

[Variation 1]

In the present embodiment, according to an operation performed on the top screen, a corresponding app screen is displayed. In the present variation, another widget is displayed according to an operation performed on the top screen, and according to an operation performed on the another widget, a corresponding app screen is displayed. The present variation is realized by modifying the second screen displaying step in the above-described embodiment in a manner as described below.

In the second screen displaying step, when the integrated service providing section 101 accepts an operation performed on any of a plurality of widgets included in the top screen, the integrated service providing section 101 displays another widget. The another widget is configured based on information outputted from an app APPx which is associated with the widget on which the operation has been accepted. Further, when the integrated service providing section 101 accepts an operation performed on another widget, the integrated service providing section 101 controls the app APPx to display an app screen. For example, the above-described "another widget" is configured to include more specific information than the widget on which the operation has been accepted on the top screen. Hereinafter, another widget is also referred to as specific widget.

Figure 14:
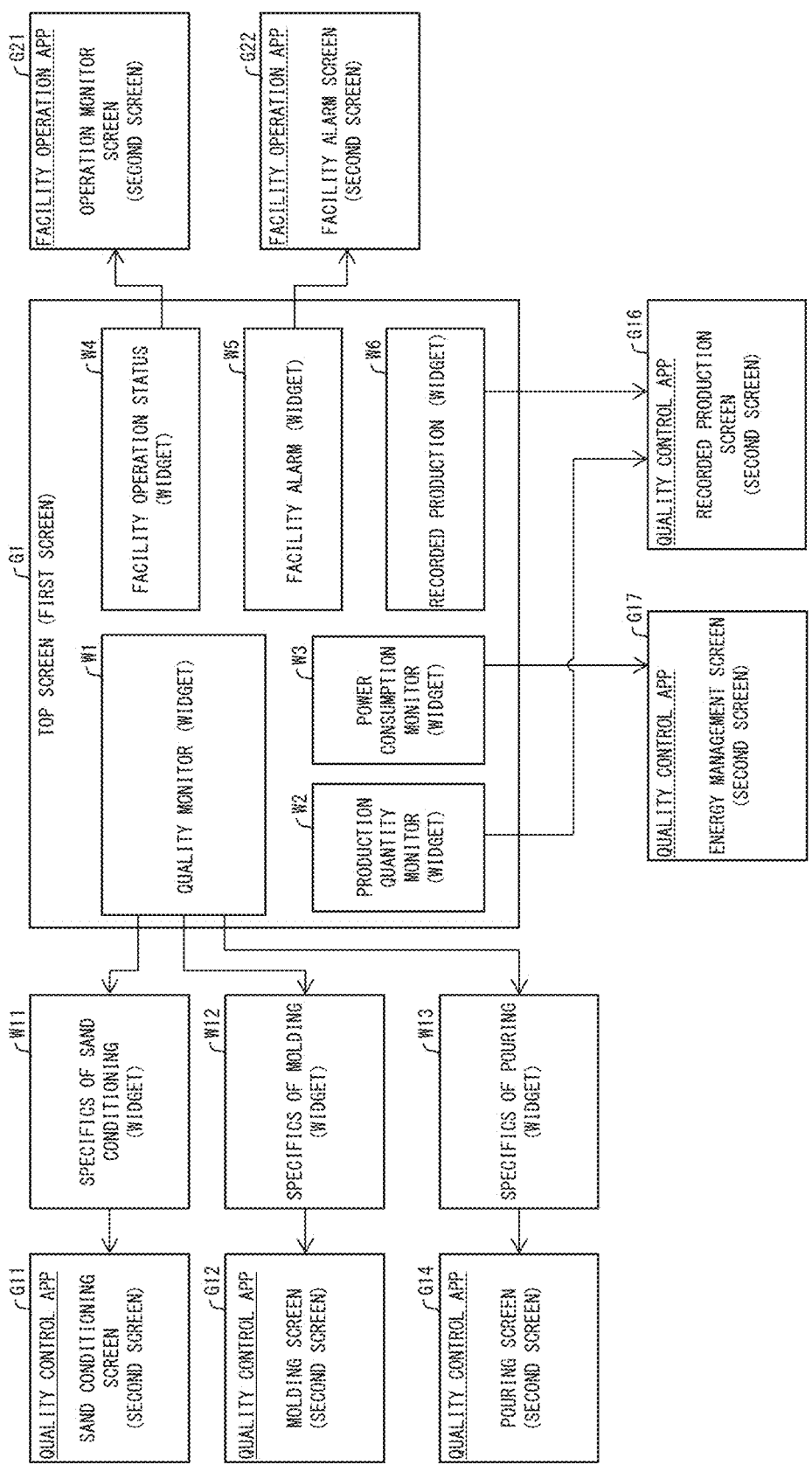
FIG. 14 is a diagram illustrating an example of transitions between screens displayed by an information processing method in accordance with a variation of Embodiment 1.

A specific example of the present variation will be discussed with reference to FIG. 14. FIG. 14 is a diagram illustrating an example of transitions between screens displayed by an information processing method in accordance with the present variation. Note that since a first screen displaying step is the same as the first screen displaying step described with reference to FIG. 3, a detailed description of the first screen displaying step will not be repeated.

In the example illustrated in FIG. 14, the widget W1 is associated with the app APP1. Then, when an operation performed on the widget W1 is accepted, the integrated service providing section 101 displays any of specific widgets W11, W12, and W13 based on information outputted from the app APP1. Any of the specific widgets W11, W12, and W13 may be displayed by being switched from the top screen G1 or may be superimposed and displayed on the top screen G1.

Figure 15:
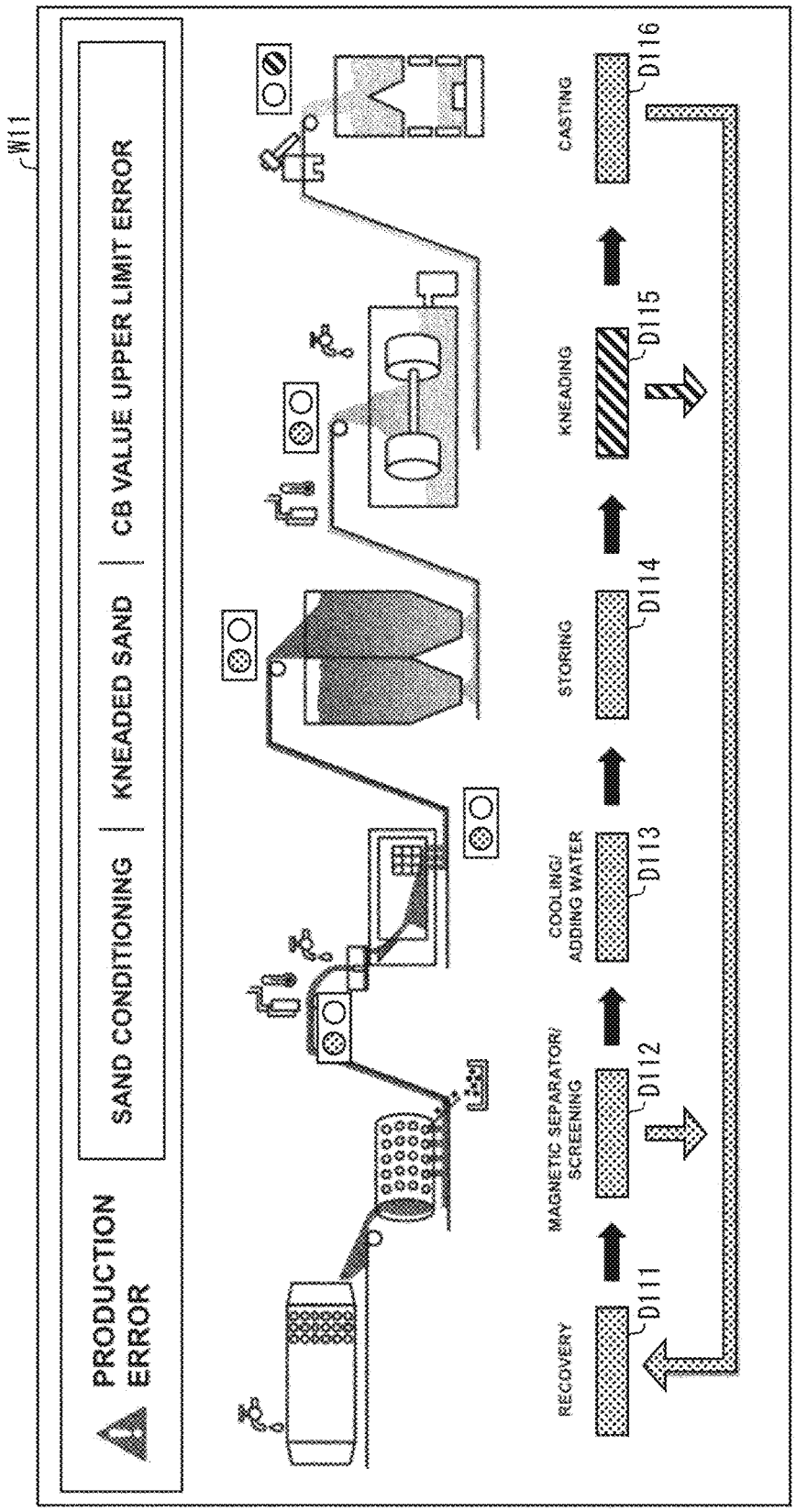
FIG. 15 is a view illustrating an example of another widget in a variation of Embodiment 1.

FIG. 15 is a view illustrating an example of the specific widget W11. The integrated service providing section 101 displays the specific widget W11 according to an operation performed on information D1 (non-defective rate in the sand conditioning process) included in the widget W1. This example assumes that the information D1 has been displayed in the widget W1 in the "abnormality-indicating display mode". As illustrated in FIG. 15, the specific widget W11 contains pieces of information D111 to D116. The pieces of information D111 to D116 indicate whether or not each specific process included in the sand conditioning process is normal.

For example, the app APP1 outputs information indicating whether or not an abnormality has occurred in each specific process included in the sand conditioning process to the integrated service providing section 101 via the data passing section 103. Based on the information outputted from the app APP1, the integrated service providing section 101 sets information corresponding to the process in which the abnormality has occurred, among the pieces of information D111 to D116, to be the "abnormality-indicating display mode", and sets the other piece(s) of information to be the "normality-indicating display mode". For example, in the example illustrated in FIG. 15, the abnormality-indicating display mode is represented by a diagonal line pattern, and the normality-indicating display mode is represented by a dot pattern. Here, the widget W11 illustrated in FIG. 15 indicates that an abnormality has occurred in a kneading process in the sand conditioning process, and the other process(es) is/are normal.

When an operation performed on the specific widget W11 has been accepted, the integrated service providing section 101 controls the app APP1 associated with the widget W1 to display the app screen G11 generated by the app APP1.

Figure 16:
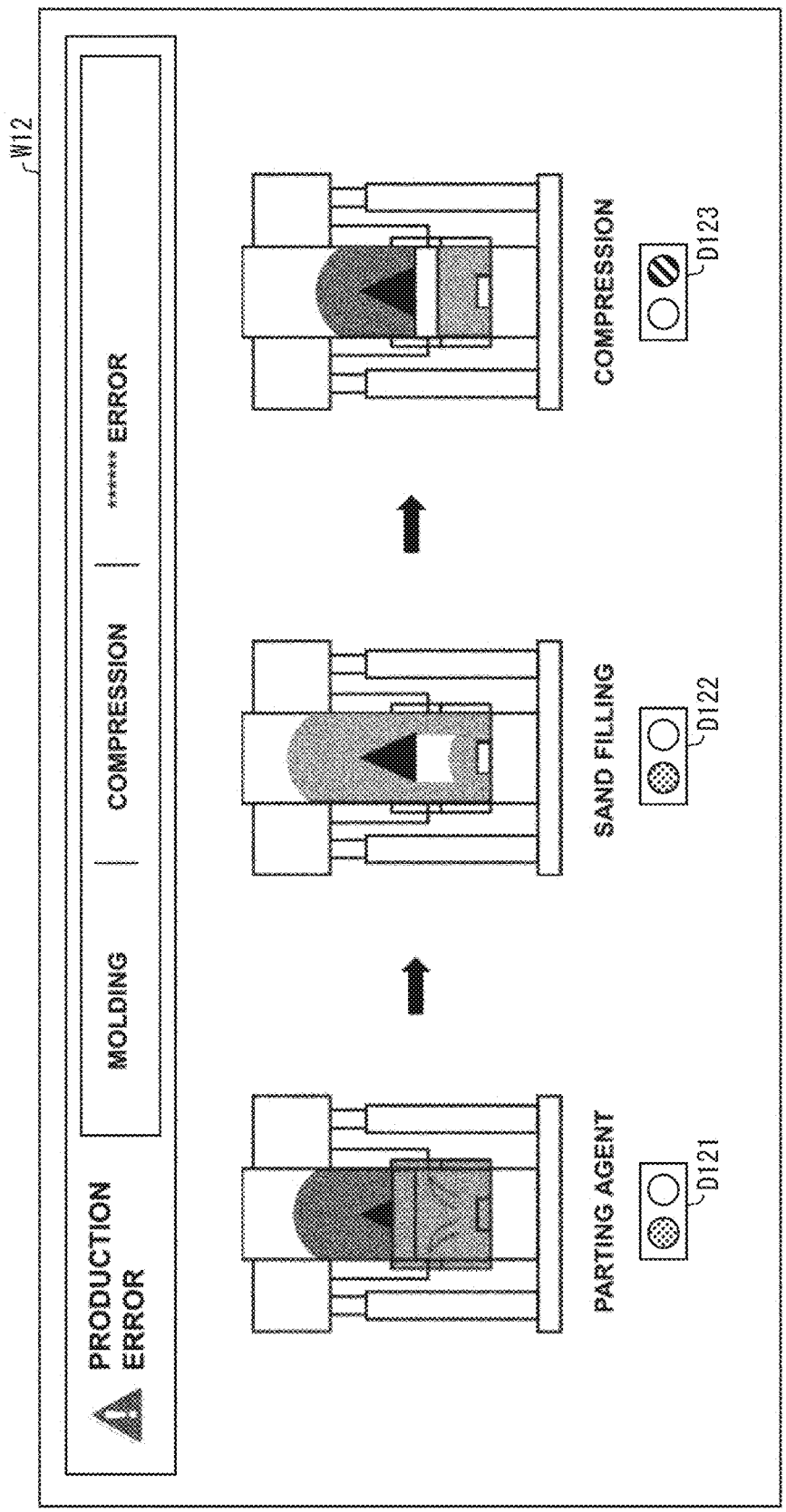
FIG. 16 is a view illustrating another example of the another widget in the variation of Embodiment 1.

FIG. 16 is a view illustrating an example of the specific widget W12. The integrated service providing section 101 displays the specific widget W12 according to an operation performed on information D2 (non-defective rate in the molding process) included in the widget W1. This example assumes that the information D2 has been displayed in the widget W1 in the "abnormality-indicating display mode". As illustrated in FIG. 16, the specific widget W12 contains pieces of information D121 to D123. The pieces of information D121 to D123 indicate whether or not each specific process included in the molding process is normal.

For example, the app APP1 outputs information indicating whether or not an abnormality has occurred in each specific process included in the molding process to the integrated service providing section 101 via the data passing section 103. Based on the information outputted from the app APP1, the integrated service providing section 101 sets information corresponding to the process in which the abnormality has occurred, among the pieces of information D121 to D123, to be the "abnormality-indicating display mode", and sets the other piece(s) of information to be the "normality-indicating display mode". For example, in the example illustrated in FIG. 16, the abnormality-indicating display mode is represented by a diagonal line pattern, and the normality-indicating display mode is represented by a dot pattern. Here, it is indicated that an abnormality has occurred in a compression process in the molding process, and the other process(es) is/are normal.

When an operation performed on the specific widget W12 has been accepted, the integrated service providing section 101 controls the app APP1 associated with the widget W1 to display the app screen G12 generated by the app APP1.

Figure 17:
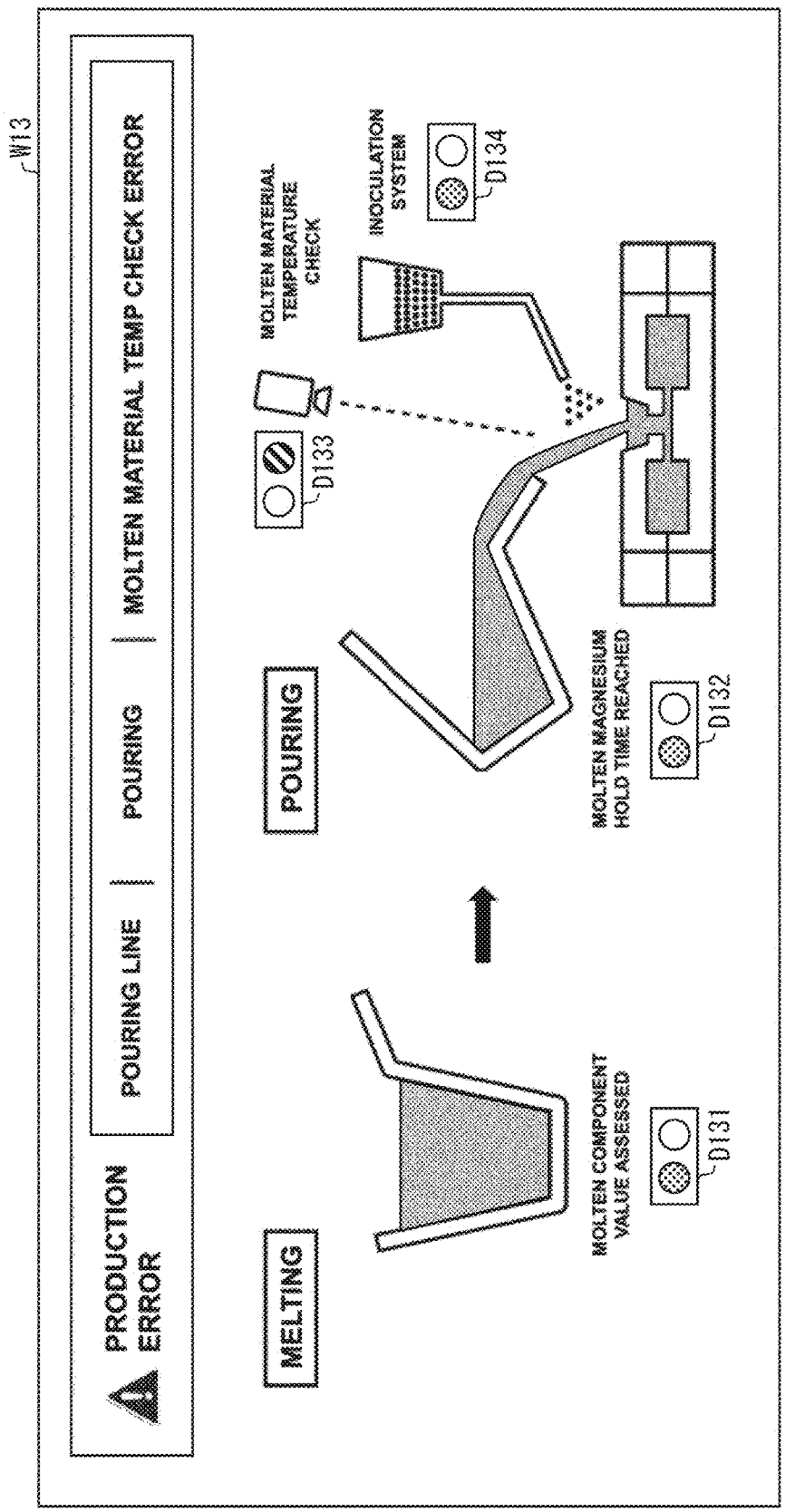
FIG. 17 is a view illustrating still another example of the another widget in the variation of Embodiment 1.

FIG. 17 is a view illustrating an example of the specific widget W13. The integrated service providing section 101 displays the specific widget W13 according to an operation performed on information D3 (non-defective rate in the pouring process) included in the widget W1. This example assumes that the information D3 has been displayed in the widget W1 in the "abnormality-indicating display mode". As illustrated in FIG. 17, the specific widget W13 contains pieces of information D131 to D134. The pieces of information D131 to D134 indicate whether or not each specific process included in the pouring process is normal.

For example, the app APP1 outputs information indicating whether or not an abnormality has occurred in each specific process included in the pouring process to the integrated service providing section 101 via the data passing section 103. Based on the information outputted from the app APP1, the integrated service providing section 101 sets information corresponding to the process in which the abnormality has occurred, among the pieces of information D131 to D134, to be the "abnormality-indicating display mode", and sets the other piece(s) of information to be the "normality-indicating display mode". For example, in the example illustrated in FIG. 17, the abnormality-indicating display mode is represented by a diagonal line pattern, and the normality-indicating display mode is represented by a dot pattern. Here, it is indicated that an abnormality has occurred in a molten material temperature checking process in the pouring process, and the other process(es) is/are normal.

When an operation performed on the specific widget W13 has been accepted, the integrated service providing section 101 controls the app APP1 associated with the widget W13 to display the app screen G14 generated by the app APP1.

<Effect of the Present Variation>

According to the server 1 and the information processing method in accordance with the present variation, in a case where the manager wants to check details of information grasped on the top screen, the manager does not necessarily have to browse an app screen of a related app APPx and can browse a specific widget before the related app screen is displayed. As a result, the manager can grasp a certain amount of specific information without starting the app APPx, and can browse the app screen of the app APPx as needed. This increases convenience.

[Variation 2]

In the present variation, in the second screen displaying step, a quality control screen generated by the management device 6 is displayed instead of the app screen generated by the app APP1.

Here, with the widgets W1, W2, W3, and W6 illustrated in FIG. 3, information indicating any of quality control screens generated by the management device 6 is associated instead of the app APP1. Further, with the widgets W11, W12, W13, W2, W3, and W6 illustrated in FIG. 14, information indicating any of the quality control screens generated by the management device 6 is associated instead of the app APP1. Specifically, the information indicating any of the quality control screens is access information (for example, universal resource locator (URL), etc.) of the quality control screen. In this case, when the integrated service providing section 101 of the server 1 accepts an operation performed on each of these widgets, the integrated service providing section 101 transmits the access information associated with the widget to the terminal 8. Further, the terminal 8 accesses the quality control screen indicated by the received access information via the network N1. Thus, the manager can transition from the first screen provided by the server 1 or the specific widget and then browse the quality control screen generated by the management device 6.

<Effect of the Present Variation>

In the present variation, in a case where the user wants to check details of information grasped on the top screen, the user can browse the app screen without going through the home screen (an example of the third screen) of the related app APPx. Specifically, by performing an operation on the first screen, the user can grasp specifics of the information by browsing the lower app screen provided by the management device 6 without going through the home screen (an example of the third screen) provided by the management device 6. This increases the convenience of the user.

Embodiment 2

Next, a server 1A in accordance with Embodiment 2 of the present invention will be discussed with reference to FIGS. 18 and 19. The server 1A provides an integrated service for collectively grasping the state of part or all of a plurality of production lines. Further, in the present embodiment, each production line is managed by a plurality of management groups having a hierarchical relationship.

<Target to which the Present Embodiment is Applied>

Figure 18:
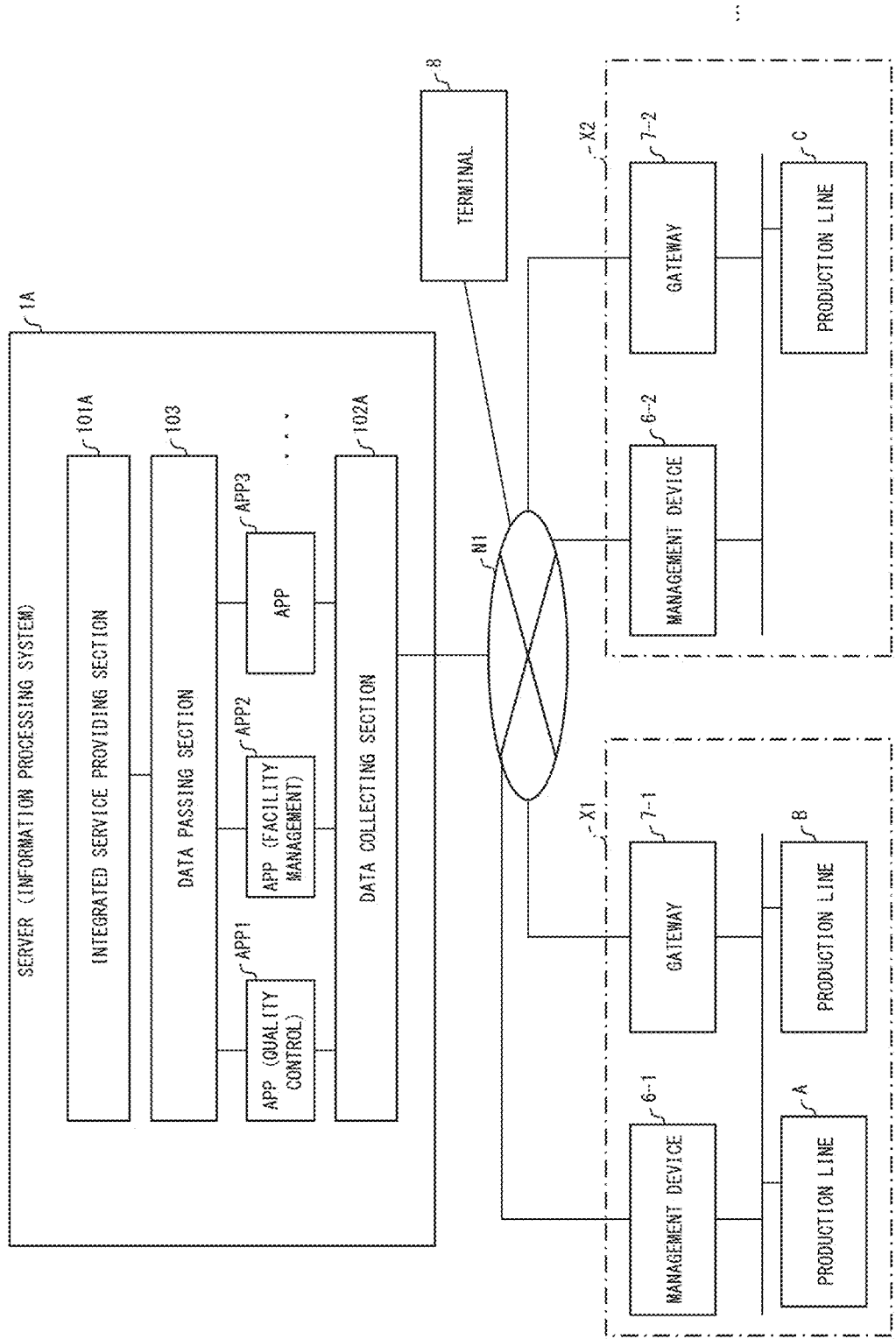
FIG. 18 is a diagram illustrating a functional configuration of an information processing system in accordance with Embodiment 2 and a specific example of a plurality of production lines to which the information processing system is applied.

FIG. 18 is a diagram illustrating a functional configuration of the server 1A and a specific example of a plurality of production lines to which the server 1A is applied. As illustrated in FIG. 18, a plurality of production lines A to C are installed in a plurality of production plants X1 to X2 in a distributed manner. The production plants X1 and X2 may exist in different locations or may exist in different buildings, different floors, or the like at the same location.

The production plant X1 includes a management device 6-1, a gateway 7-1, a production line A, and a production line B. The production plant X2 includes a management device 6-2, a gateway 7-2, and a production line C. The management devices 6-1 and 6-2 are configured in the same manner as the management device 6 in Embodiment 1. The gateways 7-1 and 7-2 are configured in the same manner as the gateway 7 in Embodiment 1. The production lines A, B, and C are configured in the same manner as the production line L in Embodiment 1. Note that FIG. 18 does not limit the number of production lines, the number of production plants, and the number of production lines included in one production plant, to which the present embodiment is applied.

Each of the production lines A to C is managed by a plurality of management groups. Each of the management groups is composed of one or more managers. Further, the plurality of management groups have a hierarchical relationship. Each management group has different authority to manage the production lines A to C according to the level of hierarchy. In the present embodiment, a management screen corresponding to the level of hierarchy of the management group is displayed.

For example, the production line A is managed by management groups Y, X1, and A. The management group Y has authority to manage the production plants X1 and X2. The management group X1 has authority to manage the production plant X1. The management group A has authority to manage the production line A. The management group Y is in a higher level of hierarchy than management groups X1 and A. The management group X1 is in a higher level of hierarchy than the management group A.

Further, the production line B is managed by management groups Y, X1, and B. The management group B has authority to manage the production line B. The management group Y is in a higher level of hierarchy than the management groups X1 and B. The management group X1 is in a higher level of hierarchy than the management group B.

Further, the production line C is managed by management groups Y, X2, and C. The management group X2 has authority to manage the production plant X2. The management group C manages the production line C. The management group Y is in a higher level of hierarchy than the management groups X2 and C. The management group X2 is in a higher level of hierarchy than the management group C.

<Functional Configuration of Server 1A>

A functional configuration of the server 1A will be discussed with reference to FIG. 18. The server 1A differs from the server 1 in accordance with Embodiment 1 in that the server 1A includes an integrated service providing section 101A, instead of the integrated service providing section 101, and a data collecting section 102A, instead of the data collecting section 102. Further, the top screen in the present embodiment differs from that in Embodiment 1 in that the configurations of a plurality of widgets included in the top screen are determined in correspondence with the management group. Hereinafter, such a top screen will also be referred to as a top screen corresponding to a management group.

The data collecting section 102A collects information indicating the state of each facility included in the production lines A, B, and C via the network N1. Specifically, the data collecting section 102A acquires information indicating the states of the production lines A and B from the management device 6-1 and the gateway 7-1. Further, the data collecting section 102 acquires information indicating the state of the production line C from the management device 6-2 and the gateway 7-2.

The integrated service providing section 101A differs from the integrated service providing section 101 in Embodiment 1 in that the integrated service providing section 101A executes an information processing method which is obtained by modifying the first screen displaying step.

<Information Processing Method Executed by Server 1A>

An information processing method executed by the server 1A differs from the information processing method in accordance with Embodiment 1 in that the first screen displaying step differs in the following points.

In the first screen displaying step, the integrated service providing section 101A displays a top screen corresponding to each management group, in response to an operation of a manager included in that management group or a management group which is in a higher level of hierarchy than that management group.

The first screen displaying step in the present embodiment will be discussed with reference to FIG. 19. FIG. 19 is a diagram illustrating an example of a top screen in the present embodiment. As illustrated in FIG. 19, a top screen G1A includes regions R1 and R2. The region R1 is a region for accepting an operation for selecting any of a plurality of management groups. The region R2 is a region for displaying a top screen corresponding to a selected management group.

In this example, the region R1 includes a tree-shaped user interface (UI) component that indicates a plurality of management groups. The tree structure shown by the UI component reflects a hierarchical relationship between a plurality of management groups. Specifically, text information "all companies", "production plant X1", "production line A", "production line B", and "production plant X2" correspond to management groups Y, X1, A, B, and X2, respectively. Note that in the UI component, items in a lower level of hierarchy can be collapsed to be hidden from view, and the "production line C" which is in a lower level of hierarchy than the "production plant X2" is hidden from view in this example. Note that the UI component displayed in the region R1 is not limited to the above-described tree-shaped UI component. For example, the UI component displayed in the region R1 may be a tab-shaped UI component. In this case, the top screen G1A includes a plurality of tabs in the region R1. Each tab corresponds to each management group. In this case, the region R1 may be located above the region R2. The UI component displayed in the region R1 is not limited to the above-described ones. Further, the layout of the regions R1 and R2 is not limited to the above-described ones.

The integrated service providing section 101A identifies the management group A selected by the manager based on an operation performed on the UI component in the region R1. Further, the integrated service providing section 101A determines whether or not the manager who has performed the operation belongs to any of the selected management group A and the management groups X1 and Y, which are in a higher level of hierarchy than the management group A. Further, in a case where the integrated service providing section 101A has determined that the manager belongs to any of them, the integrated service providing section 101A displays the top screen corresponding to the selected management group A in the region R2. Note that the management group to which the manager who has performed the operation belongs can be identified by making a request of the terminal 8 for authentication information.

In the example illustrated in FIG. 19, it is determined that the manager who has performed the operation belongs to any of the management groups A, X1, and Y. As a result, the top screen corresponding to the management group A is displayed in the region R2. The configuration of the top screen displayed in the region R2 is the same as the configuration of the top screen in Embodiment 1. However, each of the widgets W1 to W6 included in the top screen is configured based on the information outputted about the production line A by the app APPx associated with the widgets W1 to W6.

Note that although in the example illustrated in FIG. 19, the top screen corresponding to the management group A is shown, the configuration of a plurality of widgets included in the top screen corresponding to each of the other management groups B, C, X1, X2, and Y is also determined. The plurality of widgets corresponding to each management group may be configured in the same manner as those corresponding to other management groups or may be different from those corresponding to other management groups. For example, a plurality of widgets included in the top screen corresponding to the management group B may be configured in the same manner as widgets W1 to W6 for the management group A. However, in this case, each of the widgets W1 to W6 included in the top screen corresponding to the management group B is configured based on information outputted about the production line B by the app APPx associated with the widgets W1 to W6. As described above, the plurality of widgets included in the top screen corresponding to each management group are configured based on the information on the production line which is managed by that management group or by a management group which is in a lower level of hierarchy than that management group.

<Effect of the Present Embodiment>

In the present embodiment, the manager can collectively grasp the status of one or more production lines managed by the management group to which the manager belongs or by a management group which is in a lower level of hierarchy than the management group to which the manager belongs, without starting a plurality of pieces of application software individually.

[Other Variations]

In each of the above-described embodiments and variations thereof, it has been described that the app APPx associated with each widget is provided by the server 1. However, the app APPx associated with at least one of the plurality of widgets may be provided by another server which is different from the server 1.

Further, in each of the above-described embodiments and variations thereof, at least one of a plurality of widgets may be associated with two or more apps APPx. For example, the top screen G1 may include one widget associated with the apps APP1 and APP2. Such a widget is configured based on the information outputted from the app APP1 and the information outputted from the app APP2.

As a result, the user can collectively grasp the information obtained from the plurality of apps APPx regarding the state of the production line L, through at least one widget.

Further, in each of the above-described embodiments, an example in which the server 1 and the gateway 7 are connected by the network N1 which is a WAN has been described. The present invention is not limited to this configuration. The server 1 and the gateway 7 may be connected on a one-to-one basis using a mobile phone network. Such a configuration has an advantage in that an installation cost of the network N1 for connecting the server 1 and the gateway 7 becomes unnecessary. Besides, means of communication between the server 1 and the gateway 7 is not limited to the above-described example.

Further, each of the above-described embodiments can be modified into an aspect in which the server 1 is composed of a plurality of physically different individual servers. For example, the server 1 is composed of individual servers corresponding respectively to the above-described functional blocks. Specifically, the server 1 is composed of an individual server including the integrated service providing section 101, an individual server including the data collecting section 102, an individual server including the data passing section 103, and individual servers respectively corresponding to a plurality of apps APPx. The physical configuration of each individual server is as described with reference to FIG. 2. In this case, a software module group included in the same IoT platform is stored in a secondary memory of each of the individual servers respectively including the integrated service providing section 101, the data collecting section 102, and the data passing section 103. As a result, the integrated service providing section 101, the data collecting section 102, and the data passing section 103 function in the same manner as in the case where the server 1 is composed of one physical computer. Note that the aspect in which the server 1 is composed of a plurality of individual servers is not limited to the aspect in which each functional block and each individual server have a one-to-one correspondence. For example, at least one individual server among the plurality of individual servers may include a plurality of functional blocks among the integrated service providing section 101, the data collecting section 102, the data passing section 103, and each app APPx.

[Remarks]

The present invention is not limited to the embodiments, but can be altered within the scope of the claims. The present invention also encompasses, in its technical scope, any embodiment derived by combining technical means disclosed in differing embodiments.

REFERENCE SIGNS LIST

1, 1A: server
6, 6-1, 6-2: management device
7, 7-1, 7-2: gateway
8: terminal
11: processor

The invention claimed is:

1. An information processing method comprising:
a first screen displaying step of one or more processors displaying a first screen on a display, the first screen including a plurality of widgets, each of the widgets being configured based on information outputted from application software associated with each of the widgets, the application software being from among a plurality of pieces of application software that manage a state of a production line; and
a second screen displaying step of the one or more processors, when having accepted an operation performed on any widget of the plurality of widgets, controlling the application software associated with the widget to display a second screen generated by the application software on the display, wherein
the second screen is a screen displayed when a transition from a third screen is caused by the application software associated with the widget, the third screen being a home screen of the application software, and
in the second screen displaying step, when having accepted the operation, the one or more processors display the second screen generated by the application software associated with the widget on the display without displaying the third screen.

2. The information processing method according to claim 1, wherein
at least two of the plurality of widgets are associated with one piece of application software from among the plurality of pieces of application software.

3. The information processing method according to claim 1, wherein
at least one of the plurality of widgets is associated with two or more pieces of application software from among the plurality of pieces of application software.

4. The information processing method according to claim 1, wherein
in the second screen displaying step, the one or more processors, when having accepted an operation performed on any widget of the plurality of widgets, displays another widget which is configured based on information outputted from the application software associated with the widget on which the operation has been accepted and, when having accepted an operation performed on the another widget, displays the second screen.

5. The information processing method according to claim 1, wherein
when a plurality of management groups that manage the production line have a hierarchical relationship, the one or more processors, in the first screen displaying step, displays the first screen in which a configuration of the plurality of widgets is determined according to a corresponding one of the management groups, in response to an operation of a user who belongs to the corresponding one of the management group or a management group which is in a higher level of hierarchy than the corresponding one of the management groups.

6. An information processing system comprising
one or more processors,
the one or more processors execute:
a first screen displaying process of displaying a first screen on a display, the first screen including a plurality of widgets, each of the widgets being configured based on information outputted from application software associated with each of the widgets, the application software being from among a plurality of pieces of application software that manage a state of a production line; and
a second screen displaying process of, when having accepted an operation performed on a widget of the plurality of widgets, controlling the application software associated with the widget to display a second screen generated by the application software on the display, wherein
the second screen is a screen displayed when a transition from a third screen is caused by the application software associated with the widget, the third screen being a home screen of the application software, and
in the second screen displaying process, when having accepted the operation, the one or more processors display the second screen generated by the application software associated with the widget on the display without displaying the third screen.

7. A program for operating the information processing system according to claim 6, the program causing the one or more processors to execute each of the first screen displaying process and the second screen displaying process.

* * * * *